United States Patent
Mori et al.

(10) Patent No.: US 7,356,396 B2
(45) Date of Patent: Apr. 8, 2008

(54) AUTOMATIC STEERING CONTROL APPARATUS FOR VEHICLE

(75) Inventors: Yukio Mori, Kariya (JP); Kazutaka Kato, Kariya (JP); Kazuhiro Kamiya, Kariya (JP); Masahiro Matsuura, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 469 days.

(21) Appl. No.: 11/142,501

(22) Filed: Jun. 2, 2005

(65) Prior Publication Data

US 2005/0273236 A1 Dec. 8, 2005

(30) Foreign Application Priority Data

Jun. 4, 2004 (JP) ............................. 2004-167354

(51) Int. Cl.
*G06F 19/00* (2006.01)
(52) U.S. Cl. ...................... 701/41; 701/36; 180/443; 180/446
(58) Field of Classification Search .................. 701/1, 701/36, 41, 42; 180/421, 422, 443, 446
See application file for complete search history.

(56) References Cited

U.S. PATENT DOCUMENTS

| | | | | |
|---|---|---|---|---|
| 6,059,063 A | * | 5/2000 | Shimizu et al. ............. | 180/204 |
| 6,102,147 A | * | 8/2000 | Shimizu et al. ............. | 180/204 |
| 6,374,167 B2 | * | 4/2002 | Iwazaki ........................ | 701/41 |
| 7,054,729 B2 | * | 5/2006 | Maier et al. .................. | 701/36 |
| 7,085,634 B2 | * | 8/2006 | Endo et al. ................... | 701/36 |
| 7,103,461 B2 | * | 9/2006 | Iwazaki et al. ............... | 701/41 |
| 2006/0061464 A1 | * | 3/2006 | Okada et al. ................ | 340/459 |

FOREIGN PATENT DOCUMENTS

JP 2000-190863 7/2000

* cited by examiner

*Primary Examiner*—Gary Chin
(74) *Attorney, Agent, or Firm*—Buchanan Ingersoll & Rooney PC

(57) ABSTRACT

An automatic steering control performs an automatic parking control which automatically steers steerable wheels of a vehicle, without requiring a driver to perform steering wheel operation, such that the actual steering angle of the steerable wheels follows a changing target steering angle, whereby the vehicle is moved to a target parking state. When the actual steering angle fails to follow the target steering angle because of insufficiency of the steering drive force of a steering actuator, a braking force difference imparting control is performed so as to apply a predetermined braking force on the steerable wheel located inside a target vehicle locus. As a result, a steering moment is generated in the steerable wheels. This steering moment serves as a force for compensating for the insufficiency of the steering drive force of the steering actuator. As a result, the actual steering angle accurately follows the target steering angle.

12 Claims, 12 Drawing Sheets

AUTOMATIC STEERING CONTROL APPARATUS FOR VEHICLE

BACKGROUND OF THE INVENTION

1. Field of the Invention

The present invention relates to an automatic steering control apparatus for a vehicle which performs automatic steering control, such as automatic parking control, for automatically steering steerable wheels of the vehicle without requiring the driver to perform steering wheel operation.

2. Description of the Related Art

Conventionally, there have been known various steering systems, such as a steering assisting apparatus for assisting steering operation of steerable wheels of a vehicle in accordance with torque with which a driver operates the steering wheel, and a steering drive apparatus (a so-called steer-by-wire system) for drivingly steering steerable wheels of a vehicle in accordance with an amount by which a driver operates the steering wheel (see, for example, Japanese Patent Application Laid-Open No. 2000-190863).

In a vehicle to which such a steering system is applied, when an anomaly occurs in, for example, a steering actuator for drivingly steering steerable wheels, difficulty is encountered in steering the steerable wheels through only the driver's steering wheel operation. In view of this, the steering system disclosed in the publication is configured such that when an anomaly occurs in, for example, the steering actuator, a difference is produced between braking force acting on a left-hand wheel of the vehicle and that acting on a right-hand wheel of the vehicle on the basis of torque with which the driver operates the steering wheel (hereinafter may be referred to as "steering-wheel operation torque").

With this operation, a yawing moment corresponding to the direction of the steering-wheel operation torque is generated in the vehicle, and because of this yawing moment, a steering moment corresponding to the direction of the steering-wheel operation torque is generated in the steerable wheels. As a result, the steering operation of the steerable wheels is assisted, and the vehicle can be turned to a direction corresponding to the driver's intended steering operation.

Incidentally, in recent years, there has been proposed an automatic steering control apparatus which performs automatic steering control, such as automatic parking control for automatically steering steerable wheels of the vehicle, without requiring the driver's steering wheel operation, to thereby move the vehicle to a parking position desired by the driver. The force required for drivingly steering the steerable wheels during execution of the automatic steering control changes depending not only on vehicle-related factors such as tire pressure of the steerable wheels, but also on factors related to an environment of the vehicle such as road surface friction coefficient.

Accordingly, depending on the designed specifications of the steering actuator for drivingly steering the steerable wheels, in some cases the steering drive force becomes insufficient even if the steering actuator is normal. In such a case, the actual steering angle of the steerable wheels does not follow the target steering angle, so that the expected steering control cannot be performed. Therefore, such an automatic steering control apparatus is desirably provided with means for compensating for insufficiency of the steering drive force of the steering actuator when the steering drive force is insufficient.

The above-described publication neither discloses nor suggests a technique for compensating for insufficiency of the steering drive force of the steering actuator when the steering drive force of the steering actuator in a normal state becomes insufficient during performance of the automatic steering control.

SUMMARY OF THE INVENTION

In view of the foregoing, an object of the present invention is to provide an automatic steering control apparatus for a vehicle which includes means for compensating for insufficiency of steering drive force of a steering actuator when the steering drive force becomes insufficient during performance of automatic steering control for automatically steering steerable wheels of the vehicle without requiring the driver's steering-wheel operation.

The present invention provides an automatic steering control apparatus for a vehicle, comprising actual-steering-angle signal receiving means for receiving a signal indicating an actual steering angle of steerable wheels of the vehicle; target-steering-angle setting means for setting a target steering angle of the steerable wheels on the condition that a predetermined automatic-steering-control start condition is satisfied; automatic steering control means for instructing a steering actuator, adapted to steer the steerable wheels, to generate a steering drive force such that the actual angle determined on the basis of the signal indicating the actual steering angle coincides with the set target steering angle; insufficiency-degree index obtaining means for obtaining a value representing a degree of insufficiency of the steering drive force of the steering actuator; and steering drive force adding means for instructing an assisting force generation apparatus, adapted to generate an assisting force for compensating for the insufficiency of the steering drive force, to generate the assisting force when the value representing the degree of insufficiency of the steering drive force exceeds a predetermined reference value.

When the automatic steering control apparatus is an automatic parking control apparatus which automatically steers the steerable wheels of the vehicle, without requiring operation of the steering wheel by a driver, so as to move the vehicle to a parking state required by the driver, the target-steering-angle setting means is configured to set, on the basis of a state (position, direction, etc.) at the time of start of an automatic parking control to a target parking state (position, direction, etc.), target steering angles of the steerable wheels during a period in which the vehicle moves from the state at the time of start of the automatic parking control to the target parking state.

By virtue of this configuration, when the value representing the degree of insufficiency of the steering drive force of the steering actuator exceeds the predetermined reference value, the assisting force generation apparatus generates an assisting force for compensating for the insufficiency of the steering drive force. Accordingly, even when the steering drive force of the steering actuator becomes insufficient, the actual steering angle of the steerable wheels can follow the target steering angle. As a result, the expected steering control can be achieved.

Further, the steering actuator and other relevant components can be designed in consideration of the assisting force that the assisting force generation apparatus generates so as to compensate for the insufficiency of the steering drive force of the steering actuator. As a result, the size and weight of the steering actuator can be reduced, and its manufacturing cost can be lowered.

In this case, preferably, the steering drive force adding means is configured such that when the value representing the degree of insufficiency of the steering drive force exceeds the predetermined reference value, the steering drive force adding means instructs a braking control apparatus, which serves as the assisting force generation apparatus, to perform a braking force difference imparting control for imparting a difference between a braking force acting on a left-hand wheel of the vehicle and that acting on a right-hand wheel of the vehicle such that a yawing moment is generated in the vehicle in a direction for compensating for the insufficiency of the steering drive force. Alternatively, the steering drive force adding means is configured such that when the value representing the degree of insufficiency of the steering drive force exceeds the predetermined reference value, the steering drive force adding means instructs a drive control apparatus, which serves as the assisting force generation apparatus, to perform a drive force difference imparting control for imparting a difference between a drive force acting on the left-hand wheel of the vehicle and that acting on the right-hand wheel of the vehicle such that a yawing moment is generated in the vehicle in a direction for compensating for the insufficiency of the steering drive force.

By virtue of the above configuration, as in the case of the steering system disclosed in the previously-described publication, a yawing moment is generated in the vehicle in a direction for compensating for the insufficiency of the steering drive force of the steering actuator, and a steering moment is generated in the steerable wheel in a direction for compensating for the insufficiency of the steering drive force (the details of this action will be described later). As a result, compensation is made for the insufficiency of the steering drive force of the steering actuator.

In the case where the steering drive force adding means is configured to instruct the braking control apparatus to perform the braking force difference imparting control, the steering drive force adding means may be configured to perform the braking force difference imparting control by generating a braking force only in the left-hand or right-hand wheel(s) (one or both of the corresponding front and rear wheels) of the vehicle, irrespective of braking operation of the driver, or the steering drive force adding means may be configured to perform the braking force difference imparting control by generating braking forces of different magnitudes in the left-hand and right-hand wheels of the vehicle.

In the case where the steering drive force adding means is configured to instruct the drive control apparatus to perform the drive force difference imparting control, the steering drive force adding means may be configured to perform the drive force difference imparting control by generating drive forces of different magnitudes in the left-hand and right-hand wheels of the vehicle.

In the automatic steering control apparatus of the present invention, preferably, the insufficiency-degree index obtaining means is configured to obtain, as the value representing the degree of insufficiency of the steering drive force, a current which is supplied to the steering actuator so as to drive the steering actuator.

In order to cause the steering actuator to generate a steering drive force necessary for rendering the actual steering angle of the steerable wheels to coincide with the target steering angle, the current supplied to the steering actuator must be feedback-controlled on the basis of the actual steering angle. In the case where the current is feedback-controlled, the current value is typically determined through proportional-integral-derivative processing (PID processing) performed for a deviation of the actual steering angle of the steerable wheels from the target steering angle.

The current value determined through PID processing tends to increase, mainly stemming from an increase in the integral term (I term), as the degree of insufficiency of the steering drive force of the steering actuator increases, with a resultant decrease in the degree to which the actual steering angle of the steerable wheels follows the target steering angle. In other words, the current value can serve as the value which indirectly and accurately represents the degree of insufficiency of the steering drive force of the steering actuator.

Accordingly, when the above-described configuration is employed, through monitoring of the current supplied to the steering actuator during performance of the automatic steering control, the determination as to whether the degree of insufficiency of the steering drive force of the steering actuator exceeds a predetermined reference value can be performed accurately.

The insufficiency-degree index obtaining means may be configured to obtain, as the value representing the degree of insufficiency of the steering drive force, a deviation of the actual steering angle from the target steering angle. The deviation of the actual steering angle of the steerable wheels from the target steering angle can serve as the value which directly and accurately represents the degree of insufficiency of the steering drive force of the steering actuator.

Accordingly, when the above-described configuration is employed, through monitoring of the deviation of the actual steering angle of the steerable wheels from the target steering angle, which is necessary for PID processing performed for determining the current value, the determination as to whether the degree of insufficiency of the steering drive force of the steering actuator exceeds the predetermined reference value can be performed accurately.

In the automatic steering control apparatus of the present invention, preferably, the steering drive force adding means is configured to change the braking force difference or the drive force difference in accordance with the value representing the degree of insufficiency of the steering drive force of the steering actuator.

When the steering drive force of the steering actuator becomes insufficient, the assisting force required to maintain the expected steering control (accordingly, required to enable the actual steering angle of the steerable wheels to properly follow the target steering angle) increases with the degree of insufficiency of the steering drive force. Meanwhile, the greater the imparted braking force difference or drive force difference, the greater the yawing moment acting in the direction for compensating for the insufficiency of the steering drive force, and the greater the force for compensating for the insufficiency of the steering drive force.

In view of this, when the above-described configuration is employed, the braking force difference or drive force difference (accordingly, the force for compensating for the insufficiency of the steering drive force) can be set to increase with the degree of insufficiency of the steering drive force. As a result, irrespective of the degree of insufficiency of the steering drive force, the steering drive force of the steering actuator can be supplemented with a proper assisting force which is just enough for maintaining the expected steering control.

In this case, preferably, the steering drive force adding means includes influential value obtaining means for obtaining an influential value which imparts an influence on the force required to steer the steerable wheels, and is configured to change the braking force difference or the drive force difference in accordance with the influential value.

Even in the case where the degree of insufficiency of the steering drive force of the steering actuator is the same, as described above, the force for compensating for the insufficiency of the steering drive force required to maintain the expected steering control (accordingly, required to enable the actual steering angle of the steerable wheels to properly follow the target steering angle) increases when the force required to steer the steerable wheels increases because of the vehicle-related factors or the environmental factors.

Accordingly, when the above-described configuration is employed, the braking force difference or drive force difference (accordingly, the force for compensating for the insufficiency of the steering drive force) can be set to increase with the force required to steer the steerable wheels. As a result, the steering drive force of the steering actuator can be supplemented with a more proper assisting force which is just enough for maintaining the expected steering control.

Tire pressures of the steerable wheels are preferably employed as the influential value. In general, the lower the tire pressures of the steerable wheels, the greater the fictional moment in the direction of a steering moment exerted on the steerable wheels and the greater the force required to steer the steerable wheels. Accordingly, in this case, the steering drive force adding means may be configured to increase the braking force difference or drive force difference as the tire pressures of the steerable wheels decrease.

Further, a road surface friction coefficient, which is a coefficient of friction between tires of the vehicle and a road surface on which the vehicle travels, is preferably employed as the influential value. In general, the greater the road surface friction coefficient, the greater the frictional moment in the direction of a steering moment exerted on the steerable wheels and the greater the force required to steer the steerable wheels. Accordingly, in this case, the steering drive force adding means may be configured to increase the braking force difference or drive force difference as the road surface friction coefficient increases.

Further, a value which changes with the total mass of the vehicle is preferably employed as the influential value. Examples of the value which changes with the total mass of the vehicle include, but are not limited to, the total mass of the vehicle itself, the axle load acting on the axle for the steerable wheels, and the height of the vehicle. In general, the greater the total mass of the vehicle, the greater the frictional moment in the direction of a steering moment exerted on the steerable wheels and the greater the force required to steer the steerable wheels. Accordingly, in this case, the steering drive force adding means may be configured to increase the braking force difference or drive force difference as the total mass of the vehicle, which is represented by the value which changes with the total mass of the vehicle, increases.

In the automatic steering control apparatus of the present invention, preferably, the steering drive force adding means is configured to instruct the braking control apparatus to perform the braking force difference imparting control, and further includes drive force increase means for instructing a drive control apparatus to perform a drive force increase control for increasing the drive force acting on the vehicle, when the braking force difference imparting control is being performed and the total sum of braking forces acting on the wheels of the vehicle exceeds a predetermined value.

The drive force increase means is configured to increase the drive force acting on the vehicle from a base drive force determined in accordance with operation of an accelerator pedal by the driver.

When the braking force difference imparting control is performed, the braking force generated by the control serves as a deceleration force for decelerating the vehicle. Accordingly, when the braking force generated by the control is large, the vehicle body speed may decrease and the vehicle may stop. Such stoppage of the vehicle stemming from the braking force difference imparting control is undesirable.

In view of this, as described above, the automatic steering control apparatus is configured to increase the drive force acting on the vehicle when the total sum of braking forces acting on the wheels of the vehicle because of the braking force difference imparting control exceeds a predetermined value. Therefore, stoppage of the vehicle stemming from the braking force difference imparting control can be avoided, and thus, the driver does not feel an undesirable sensation stemming from stoppage of the vehicle.

In this case, the drive force increase means is preferably configured to increase the drive force acting on the vehicle by an amount corresponding to the total sum of braking forces acting on the wheels of the vehicle. When braking forces are applied to the wheels of the vehicle by means of the braking force difference imparting control, the drive force acting on the vehicle decreases by an amount corresponding to the total sum of braking forces applied by means of the braking force difference imparting control.

As a result, the drive force acting on the vehicle decreases from the above-mentioned base drive force determined on the basis of the accelerator operation of the driver by an amount corresponding to the total sum of braking forces applied by means of the braking force difference imparting control. In contrast, when the above-described configuration is employed, the drive force acting on the vehicle can be maintained at the base drive force determined on the basis of the accelerator operation of the driver. As a result, the diver can continuously obtain a sensation of acceleration corresponding to the accelerator operation performed by the driver his/herself even in a period in which the braking force difference imparting control is performed.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
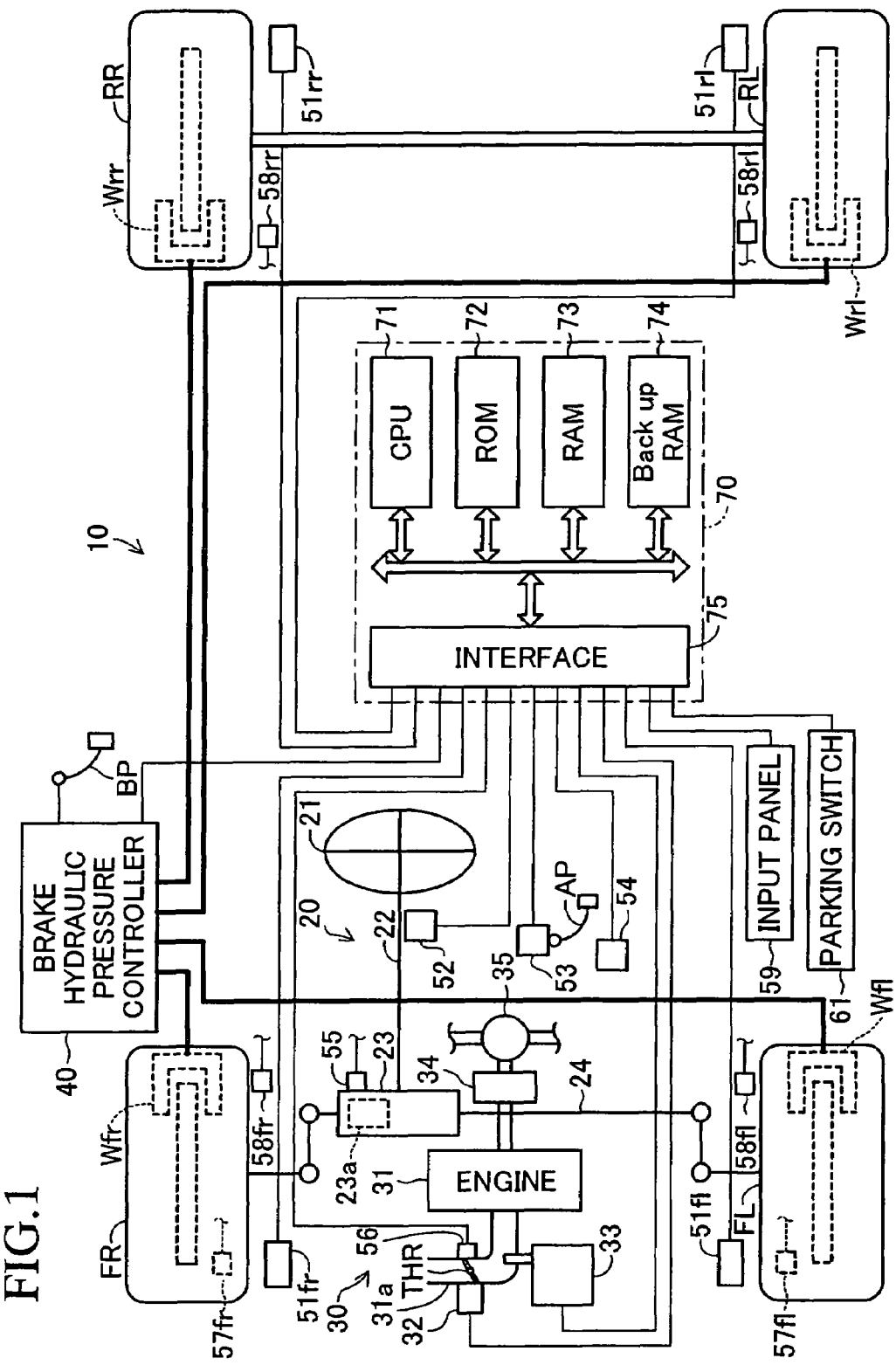
FIG. 1 is a schematic diagram of a vehicle equipped with a vehicle motion control apparatus which includes an automatic steering control apparatus for a vehicle according to an embodiment of the present invention.

An automatic steering control apparatus for a vehicle according to an embodiment of the present invention will now be described with reference to the drawings. FIG. 1 is a schematic diagram of a vehicle equipped with a vehicle motion control apparatus 10 which includes an automatic steering control apparatus for a vehicle according to the embodiment of the present invention. The illustrated vehicle is a four-wheel, front-wheel drive vehicle having two front wheels (a front left wheel FL and a front right wheel FR) which are steerable, driven wheels; and two rear wheels (a rear left wheel RL and a rear right wheel RR) which are nondriven wheels.

This automatic steering control apparatus is an automatic parking control apparatus which brings the vehicle into a parking state which the drive wishes, by automatically steering steerable wheels (front wheels) of the vehicle, without requiring the driver's steering wheel operation.

This vehicle motion control apparatus 10 has a front-wheel steering mechanism section 20 for steering the steerable wheels FL and FR; a drive force transmission mechanism section 30 (drive control apparatus) which generates a drive force and transmits it to the driven wheels FL and FR; and a brake hydraulic pressure controller 40 (braking control apparatus) for generating a braking force in each wheel by brake hydraulic pressure.

The front-wheel steering mechanism section 20 comprises a steering wheel 21; a steering column 22 which is rotatable together with the steering wheel 21; a power steering apparatus 23 which is linked to the steering column 22; and a link mechanism section 24 which includes a tie rod that is moved along a left-right direction of the vehicle (hereinafter may be referred to as the "lateral direction") by the power steering apparatus 23, and links which can steer the steerable wheels FL and FR in accordance with movement of the tie rod. By virtue of this structure, when the steering wheel 21 is rotated from the neutral position (reference position), the actual steering angle of the steerable wheels FL and FR is changed from a reference angle at which the vehicle go straight.

The power steering apparatus 23 is a so called electric power steering apparatus, which is configured to generate assist force for moving the tie rod in the lateral direction in accordance with torque with which a driver operates the steering wheel. Thus, the steering wheel operation of the driver is assisted.

The power steering apparatus 23 also includes a known steering actuator 23a which is composed of a DC motor and which generates drive force (steering drive force) for automatically moving the tie rod in the lateral direction independently of the steering wheel operation of the driver. This enables automatic steering of the steerable wheels FL and FR without requiring the driver's steering wheel operation. Detailed descriptions of the specific structures of the power steering apparatus 23 and the steering actuator 23a are omitted.

The drive force transmission mechanism section 30 comprises an engine 31 which generates drive force, a throttle valve actuator 32 comprising a DC motor which controls the opening TA of a throttle valve THR which is disposed in an intake pipe 31a of the engine 31 and which varies the open cross-sectional area of the intake passage, a fuel injection apparatus 33 which includes unillustrated fuel injectors which spray fuel in the vicinity of unillustrated intake ports of the engine 31, a transmission 34 which is connected to an output shaft of the engine 31, and a differential gear 35 which distributes between the front wheels FR and FL the drive force which is transmitted from the transmission 34.

The brake hydraulic pressure controller 40 includes an unillustrated master cylinder, a plurality of solenoid valves, a hydraulic pump, and a motor for driving the hydraulic pump. The brake hydraulic pressure controller 40 is configured such that when the hydraulic pump (motor) is in a non-driven state and all the solenoid valves are in their unexcited states, a brake hydraulic pressure corresponding to an operating force with which the driver operates a brake pedal BP is supplied to wheel cylinders Wfr, Wfl, Wrr, and Wrl corresponding to the respective wheels. Thus, a braking force corresponding to the driver's braking operating is applied to each wheel.

Also, the brake hydraulic pressure controller 40 is configured to independently control the brake hydraulic pressures within the respective wheel cylinders, independently of the driver's braking operating, by property controlling the plurality of solenoid valves and the hydraulic pump (motor). As a result, the braking force applied to each wheel can be controlled individually. This enables braking force difference imparting control to be described later. Notably, the detailed description of the specific structure of the brake hydraulic pressure controller 40 is omitted.

Referring again to FIG. 1, the vehicle motion control apparatus 10 includes wheel speed sensors 51$fr$, 51$fl$, 51$rr$, and 51$rl$ which are composed of rotary encoders, each outputting a signal having a pulse each time the corresponding wheel FR, FL, RR, or RL rotates by a prescribed angle;

a steering-wheel operation torque sensor 52 which detects torque with which the driver operates the steering wheel and outputs a signal indicative of the steering-wheel operation torque Ts; an accelerator operation sensor 53 which senses the amount of operation (opening) of an accelerator pedal AP operated by the driver and outputs a signal indicative of the accelerator-pedal operation amount Accp; a yaw rate sensor 54 which detects yaw rate acting on the vehicle and outputs a signal indicative of the yaw rate Yr; and an actual steering angle sensor 55 which detects the actual steering angle of the steerable wheels FL and FR with respect to a reference angle at which the vehicle goes straight, by detecting the lateral position of the be rod, and outputs a signal indicative of the actual steering angle THs.

The steering-wheel operation torque Ts assumes a positive value when the driver applies a torque to the steering wheel 21 to rotate the same counterclockwise as viewed from the driver, and assumes a negative value when the driver applies a torque to the steering wheel 21 to rotate the same clockwise. The yaw rate Yr assumes a positive value when the vehicle turns counterclockwise (as viewed from the upper side of the vehicle), and assumes a negative value when the vehicle turns clockwise.

The actual steering angle THs assumes a positive value when the steerable wheels FR and FL are steered in such a direction that the vehicle turns counterclockwise (as viewed from the upper side of the vehicle) when the vehicle goes forward (such direction will be referred to as the "left direction"), and assumes a negative value when the steerable wheels FR and FL are steered in such a direction that the vehicle turns clockwise when the vehicle goes forward (such direction will be referred to as the "right direction").

Further, the vehicle motion control apparatus 10 includes a throttle valve opening sensor 56 which detects the opening of the throttle valve THR and outputs a signal indicative of the throttle valve opening TA; tire pressure sensors 57*fr* and 57*fl* which detect tire air pressures of the steerable wheels FR and FL and output signals indicative of the respective tire pressures Pfr and Pfl; and vehicle height sensors 58*fr*, 58*fl*, 58*rr*, and 58*rl* which detect the heights of specific portions of the vehicle body above the wheels FR, FL, RR, and RL, respectively, and output signals indicating the vehicle heights hfr, hfl, hrr, and hrl, respectively.

The vehicle motion control apparatus 10 also includes an input panel 59 with which the driver manually inputs data regarding a target parking state to be described later; and a parking switch 61 with which the driver instructs start of automatic parking control to be described later.

Moreover, the vehicle motion control apparatus 10 includes an electronic controller 70. The electronic controller 70 is a microcomputer including a CPU 71; ROM 72 in which are previously stored programs which are executed by the CPU 71, tables (look-up tables and maps), constants, and the like; RAM 73 in which the CPU 71 temporarily stores data as necessary; backup RAM 74 which stores data when the power supply is on and which maintains the stored data when the power supply is cut off; an interface 75 containing an A/D converter; and other necessary components. The above components are interconnected by a bus.

The interface 75 is connected to the above-described sensors, etc. 51 to 59 and 61, and supplies signals from the same 51 to 59 and 61 to the CPU 71. Also, in accordance with instructions from the CPU 71, the interface 75 outputs drive signals to the solenoid valves of the brake hydraulic pressure controller 40, the motor for driving the hydraulic pump, the steering actuator 23*a*, the throttle valve actuator 32, and the fuel injection apparatus 33.

Through control by the electronic controller 70, the throttle valve actuator 32 drives the throttle valve THR such that the throttle valve opening TA basically coincides with an opening (reference opening) corresponding to the operation amount Accp of the accelerator pedal AP; and the fuel injection apparatus 33 sprays the necessary amount of fuel so as to obtain a target air-fuel ratio (a theoretical air-fuel ratio) with respect to an intake air amount corresponding to the throttle valve opening TA.

Outline of Automatic Parking Control:

Automatic parking control which is performed by the vehicle motion control apparatus 10 (hereinafter referred to as the "present apparatus") including the automatic steering control apparatus (automatic parking control apparatus) of the present apparatus, which has the above-described structure, will be described with reference to FIG. 2.

Figure 2:
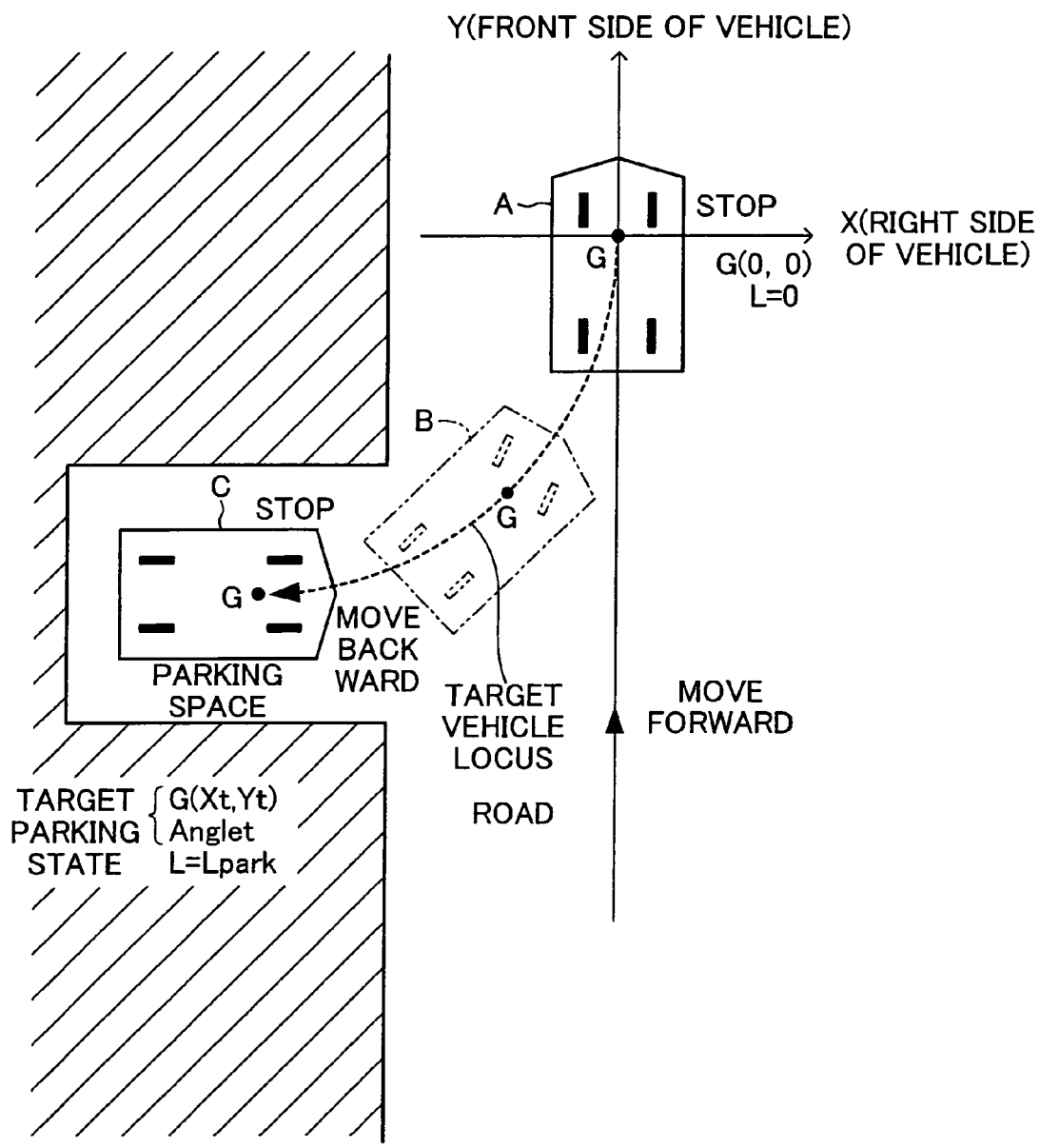
FIG. 2 is an illustration showing an example locus of the vehicle when the automatic steering control apparatus of FIG. 1 performs an automatic parking control while moving the vehicle backward.

FIG. 2 shows a case in which the driver stops the vehicle in a state (position, direction) indicated by A after straight advancement, and the driver causes the vehicle to be moved from the state indicated by A to a state (target parking state) indicated by C, while the steerable wheels FR and FL are automatically steered by means of the automatic steering control.

In this case, first, the drive inputs from the input panel 59 data regarding the target parking state indicated by C, while maintaining the vehicle in the state (stopped state) indicated by A. The input of data regarding the target parking state is not permitted unless the vehicle is in a stopped state. At this time, the present apparatus sets an X-Y orthogonal coordinate system such that, as shown in FIG. 2, the centroid G of the vehicle coincides with the origin (0,0), the X-axis coincides with the lateral direction of the vehicle, and the Y-axis coincides with the fore-aft direction of the vehicle.

At this time, a map around the present position of the vehicle is displayed on the input panel 59 in an enlarged fashion on the basis of data from an unillustrated navigation apparatus. The driver inputs the data regarding the target parking state, while utilizing the display.

The data regarding the target parking state include the position coordinate G (Xt, Yt) of the centroid G of the vehicle in the target parking state, and a yaw angle change amount Anglet during a period in which the vehicle moves from the present state (state indicated by A) to the target parking state (state indicated by C). In the case shown in FIG. 2, both the X-coordinate valve Xt and the Y-coordinate valve Yt assume negative values, and the yaw angle change amount Anglet is 90° in the counterclockwise direction (as viewed from the upper side of the vehicle).

Upon completion of input of such data regarding the target parking state, the driver instructs start of the automatic parking control by operating the parking switch 61. In response thereto, the present apparatus calculates an optimal locus (target vehicle locus) regarding the centroid G of the vehicle during the period in which the vehicle moves from the present state to the target parking state, on the basis of the actual steering angle THs in the present state (zero in the case shown in FIG. 2), the above-described input data regarding the target parking state, and data of the map around the present position of the vehicle.

At this time, determination as to whether the vehicle moves forward or backward during the automatic parking control is performed on the basis of the relative relation between the present state (state indicated by A) of the vehicle and the target parking state (state indicated by C). In the case shown in FIG. 2, the target vehicle locus is calculated on the basis of the determination that the vehicle moves backward as indicated by a broken curved line.

Subsequently, on the basis of the calculated target vehicle locus and geometric characteristics in relation to steering of the vehicle, the present apparatus creates a map MapTHst(L) (0≦L≦Lpark) which defines the relation between moved distance L from the present state and target steering angle THst during the period in which the vehicle moves from the present state to the target parking state. The present apparatus then stores data which represent the map MapTHst in a predetermined memory area of the RAM 73. The value Lpark represents the moved distance at the time when the vehicle reaches the target parking state. Further, the target steering angle THst is set such that it becomes zero when the vehicle reaches the target parking state.

Figure 3:
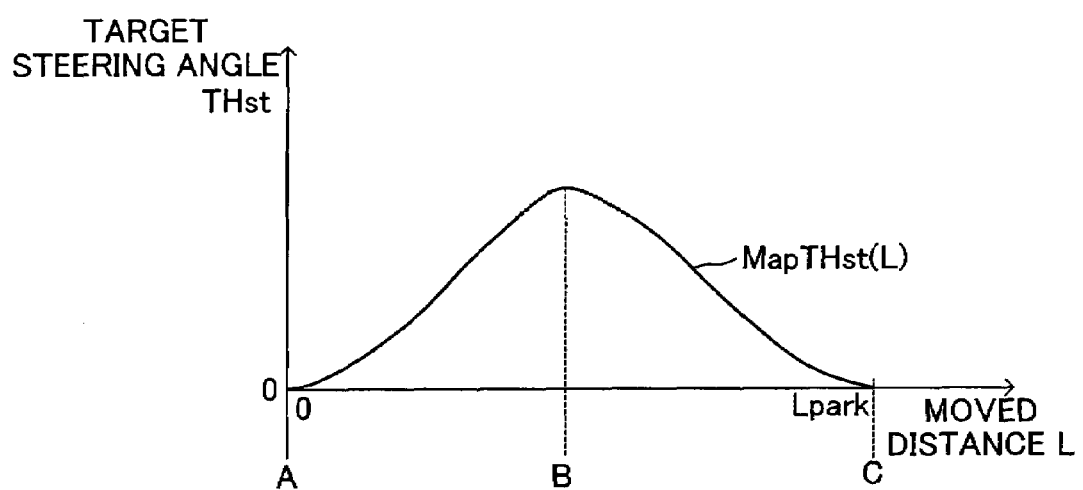
FIG. 3 is a graph showing the relation between moved distance of the vehicle and target steering angle during performance of the automatic parking control shown in FIG. 2.

FIG. 3 shows the map MapTHst for the case shown in FIG. 2. That is, the target steering angle THst is set such that the target steering angle THst is zero in the present state (state indicated by A; i.e., moved distance L=0), assumes the maximum positive value (i.e., leftward) in a state indicated by B, and again becomes zero in the target parking state (state indicated by C; i.e., moved distance L=Lpark).

Upon completion of creation and storage of the map MapTHst, the present apparatus starts automatic steering by means of the automatic parking control. Specifically, when the vehicle starts a movement (backward movement in the case shown in FIG. 2) in response to, for example, operations of the accelerator pedal AP and the brake pedal BP by the driver, the present apparatus feedback-controls current supplied to the steering actuator 23a (accordingly the steering drive force of the steering actuator 23a) such that the actual steering angle THs of the steerable wheels FR and FL follows the target steering angle THst that changes with the moved distance L.

In this case, an instruction value of such current (instruction current id) is determined through PID processing performed for a value (steering angle difference DTHs) obtained by subtracting the actual steering angle THs from the target steering angle THst; specifically, is determined in accordance with the following Eq. (1). In Eq. (1), SDTHs represents the time integration value of the steering angle difference DTHs, and DDTHs represents the time derivative value of the steering angle difference DTHs. Kp, Ki, Kd represent a proportional constant, an integral constant, and a derivative constant, respectively. When the instruction current id is positive, the steering drive force of the steering actuator 23a serves as a force for steering the steerable wheels FR and FL leftward. When the instruction current id is negative, the steering drive force of the steering actuator 23a serves as a force for steering the steerable wheels FR and FL rightward.

$$id = Kp \cdot DTHs + Ki \cdot SDTHs + Kd \cdot DDTHs \quad (1)$$

By virtue of the above operation, the steerable wheels FR and FL are automatically steered, so that the centroid G of the vehicle moves along the target vehicle locus. When the vehicle reaches the target parking state (that is, when the moved distance L attains the value Lpark), the present apparatus ends the above-described automatic parking control. The above is the outline of the automatic parking control.

Outline of Braking-Force-Difference Imparting Control:

As described previously, the force required for steering the steerable wheels FR and FL changes depending on vehicle-related factors and other factors. Therefore, in some cases, the steering drive force of the steering actuator 23a becomes insufficient during performance of the automatic parking control.

Figure 4:
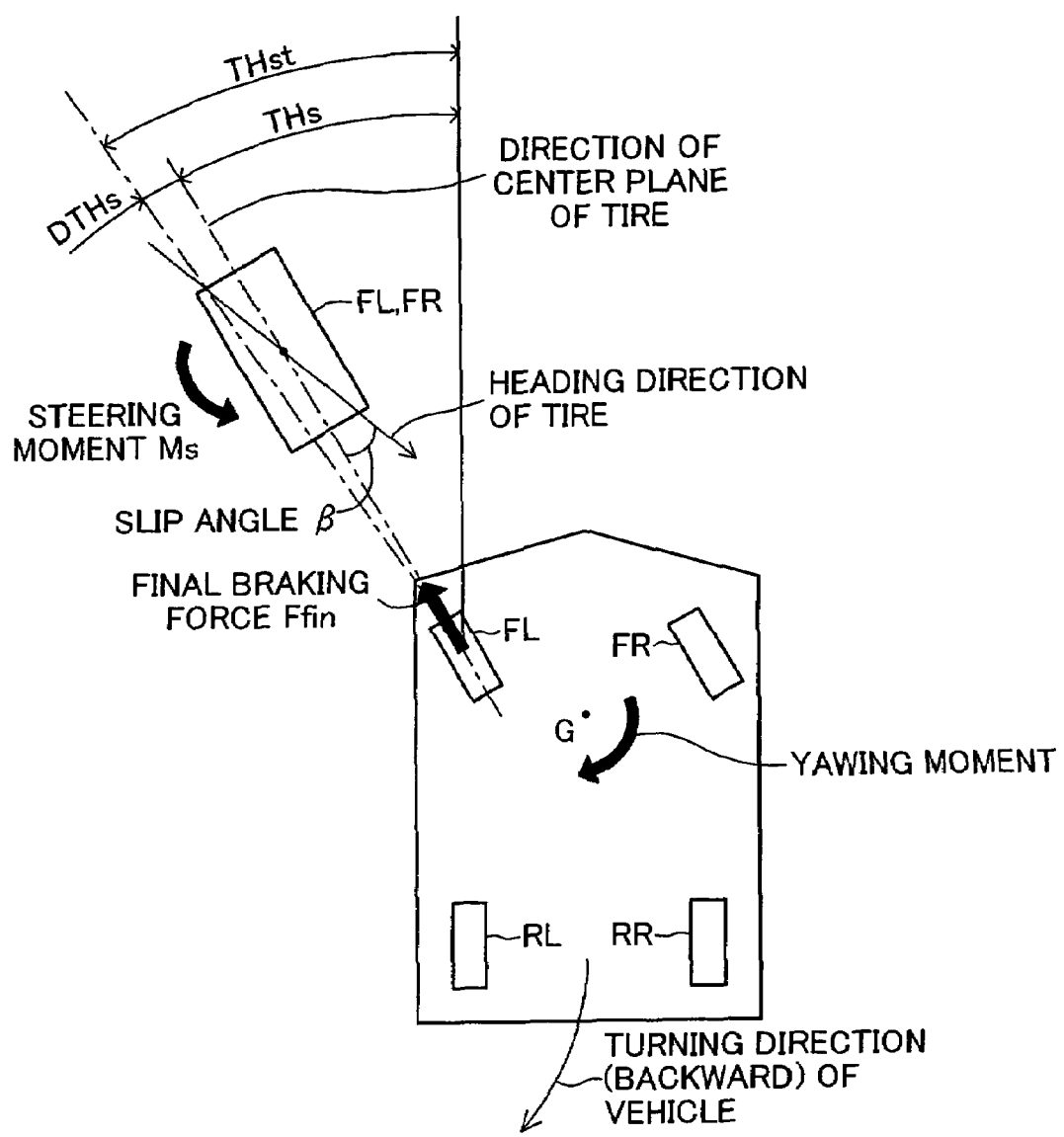
FIG. 4 is an illustration used for explaining a mechanism of generation of a steering moment in a steerable wheel through execution of a braking force difference imparting control during the automatic paring control.

FIG. 4 shows the case in which the steering drive force of the steering actuator 23a becomes insufficient when the steerable wheels FR and FL are gradually steered leftward, in synchronism with the backward movement of the vehicle, during performance of the automatic parking control shown in FIG. 2. In this case, the actual steering angle THs of the steerable wheels FR and FL fails to follow the target steering angle THst, and the trend that the value (positive value) of the actual steering angle THs becomes smaller than the target steering angle THst (positive value) continues.

When the steering drive force becomes insufficient as described above, the present apparatus performs braking force difference imparting control so as to generate a force for compensating for the insufficiency of the steering drive force. The details of the braking force difference imparting control will be described with the case shown in FIG. 4 taken as an example.

<Details of Braking Force Difference Imparting Control>

For example, in the case where the vehicle moves backward while turning in a state in which the steerable wheels FR and FL are steered leftward as shown in FIG. 4, when a braking force is applied to the wheels located inside the target vehicle locus (in the present example, only to the steerable wheel FL of the left-hand wheels), a difference is produced between the braking force acting on the left-hand wheels and that acting on the right-hand wheels. Because of this braking force difference, a clockwise yawing moment (as viewed from the upper side of the vehicle) is generated about the centroid G of the vehicle.

When such a clockwise yawing moment is generated in the vehicle, as shown in FIG. 4, the heading direction of the tire of each of the steerable wheels FR and FL deviates to the direction shown in FIG. 4 with respect to the center plane of the tire (that is, a slip angle β is generated). In general, when a slip angle β is generated in a tire, a steering moment is generated in the tire in a direction such that the slip angle β becomes zero; i.e., a direction such that the direction of the center plane of the tire coincides with the heading direction of the tire.

Accordingly, in the case shown in FIG. 4, a steering moment Ms that steers the steerable wheels FR and FL leftward is generated. This steering moment Ms serves as a force for compensating for the insufficiency of the steering drive force of the steering actuator 23a, which is steering the steerable wheels FR and FL leftward.

As described above, in the case where the steering drive force of the steering actuator 23a becomes insufficient when the vehicle turns while moving backward, a force for compensating for the insufficiency of the steering drive force is generated through application of a braking force to the wheel located inside the target vehicle locus. As a result, the actual steering angle THs of the steerable wheels FR and FL become able to follow the target steering angle THst, whereby the expected steering control is maintained and achieved.

The case where the vehicle turns while moving backward has been described; however, the above-described control can be performed in the case where the vehicle turns while moving forward. In this case as well, a force for compensating for the insufficiency of the steering drive force is generated in the same mechanism, through application of a braking force to the wheel (front, steerable wheel) located inside the target vehicle locus. A description for this case is omitted. The above is the outline of the braking force difference imparting control.

<Start Condition of Braking Force Difference Imparting Control>

Next, the start condition of the braking force difference imparting control will be described. As described above, when the steering drive force of the steering actuator 23a becomes insufficient, the actual steering angle THs of the steerable wheels FR and FL fails to follow the target steering angle THst, resulting in continuation of the trend that the absolute value of the actual steering angle THs becomes smaller than the absolute value of the target steering angle THst.

In this case, as can be understood from the above-described Eq. (1), the absolute value of the instruction current id supplied to the steering actuator 23a gradually increases, mainly because of a gradual increase in the absolute value of the time integral value SDTHs of the steering angle difference DTHs (accordingly, the absolute value of the integral term (Ki·SDTHs)).

In view of this, when the absolute value of the instruction current id supplied to the steering actuator 23a (the value representing the degree of insufficiency of the steering drive force) exceeds a predetermined reference value ith 1, the present apparatus determines that the steering drive force of the steering actuator 23a becomes insufficient, and starts the above-described braking force difference imparting control.

<Setting of Braking Force to be Applied>

Next, there will be described setting of a braking force to be applied to the steerable wheel located inside the target vehicle locus in the braking force difference imparting control. The greater the braking force applied to the steerable wheel located inside the target vehicle locus, the greater the braking force difference, resulting in an increase in the above-mentioned yawing moment, so that the above-mentioned steering moment Ms (accordingly, the force for compensating for the insufficiency of the steering drive force) increases.

Meanwhile, the force for compensating for the insufficiency of the steering drive force is preferably increased with the steering angle difference DTHs (the absolute value thereof); that is, with the degree of insufficiency of the steering drive force. In view of the above, the braking force applied to the steerable wheel located inside the target vehicle locus is preferably increased with the absolute value of the steering angle difference DTHs.

Moreover, even when the steering angle difference DTHs (the absolute value thereof) is constant, the force for compensating for the insufficiency of the steering drive force must be increased with the force required for steering the steerable wheels FR and FL The force required for steering the steerable wheels FR and FL tends to increase because of an increase in a friction moment in the direction of a steering moment acting on the steerable wheels FR and FL, as the tire pressure Pfr and Pfl (e.g., mean tire pressure Pmean) of the steerable wheels FR and FL decrease, as the road surface friction coefficient $\mu$ increases, or as the total mass of the vehicle increases.

When the total mass of the vehicle increases, the height of the vehicle (e.g., the mean value of vehicle heights hfr, hfl, hrr, and hrl (mean vehicle height hmean)) decreases. Accordingly, the force required for steering the steerable wheels FR and FL tends to increase as the mean vehicle height hmean decreases.

Figure 5:
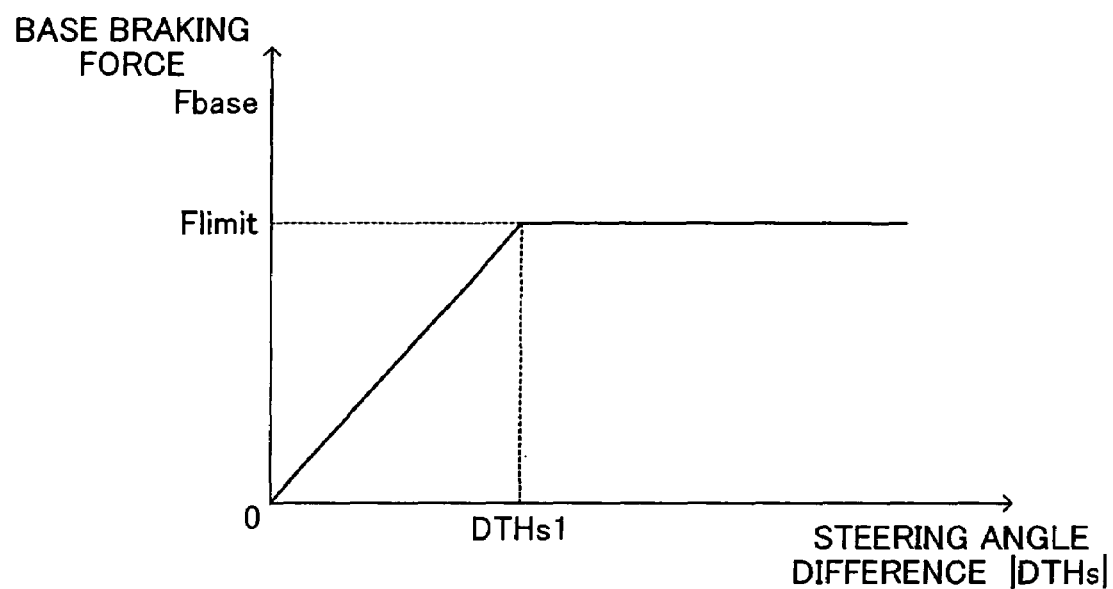
FIG. 5 is a graph showing a map which defines the relation between absolute value of steering angle difference and base braking force and to which the CPU shown in FIG. 1 refers.

In view of the above, the present apparatus first obtains a base braking force Fbase from a map MapFbase(|DTHs|) shown in FIG. 5 and defining the relation between the absolute value |DTHs| of the steering angle difference and the base braking force Fbase. Thus, the base braking force Fbase increases with the absolute value |DTHs| of the steering angle difference. Notably, when the absolute value |DTHs| of the steering angle difference exceeds a value DTHs1, the base braking force Fbase is restricted to an upper limit value Flimit.

Figure 6:
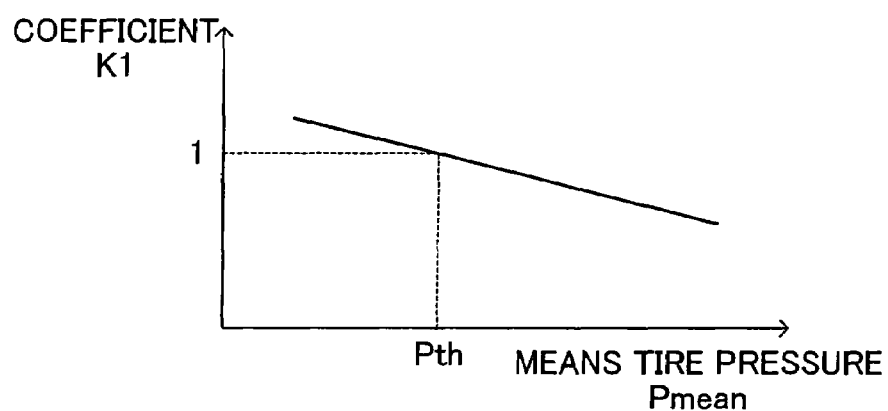
FIG. 6 is a graph showing a map which defines the relation between average tire pressure and value of a coefficient used for obtaining final braking force from the base braking force and to which the CPU shown in FIG. 1 refers.

Further, the present apparatus obtains the value of a coefficient K1 from a map MapK1 (Pmean) shown in FIG. 6 and defining the relation between the mean tire pressure Pmean and value of the coefficient K1. Thus, the coefficient K1 becomes 1 when the mean tire pressure Pmean is equal to a reference value Pth, and increases as the mean tire pressure Pmean decreases.

Figure 7:
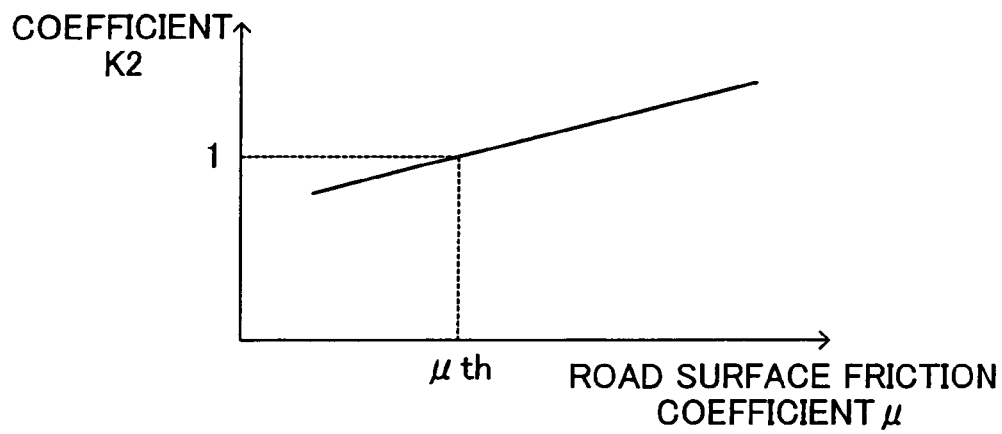
FIG. 7 is a graph showing a map which defines the relation between road surface friction coefficient and value of a coefficient used for obtaining the final braking force from the base braking force and to which the CPU shown in FIG. 1 refers.

Similarly, the present apparatus obtains the value of a coefficient K2 from a map MapK2($\mu$) shown in FIG. 7 and defining the relation between the road surface friction coefficient $\mu$ and value of the coefficient K2. Thus, the coefficient K2 becomes 1 when the road surface friction coefficient $\mu$ is equal to a reference value $\mu$th, and increases as the road surface friction coefficient $\mu$ increases.

Figure 8:
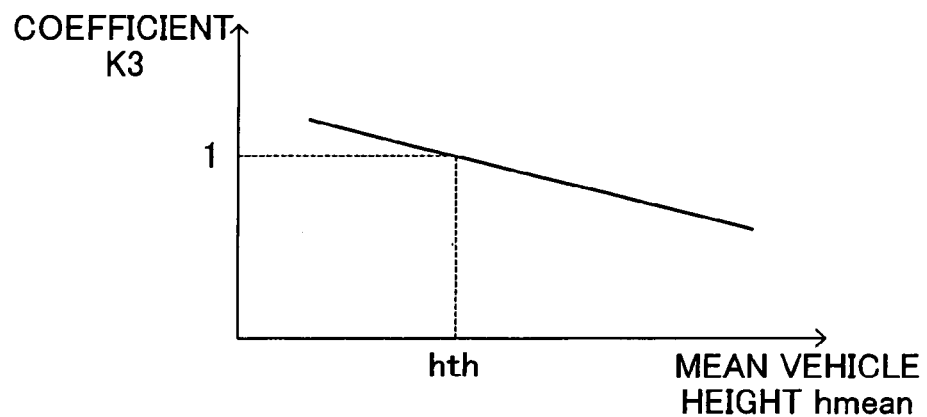
FIG. 8 is a graph showing a map which defines the relation between average vehicle height and value of a coefficient used for obtaining the final braking force from the base braking force and to which the CPU shown in FIG. 1 refers.

In addition, the present apparatus obtains the value of a coefficient K3 from a map MapK3 (hmean) shown in FIG. 8 and defining the relation between the mean vehicle height hmean and value of the coefficient K3. Thus, the coefficient K3 becomes 1 when the mean vehicle height hmean is equal to a reference value hth, and increases as the mean vehicle height hmean decreases.

Subsequently, in accordance with the following Eq. (2), the present apparatus obtains a braking force (final braking force Ffin) to be applied to the steerable wheel located inside the target vehicle locus in the braking force difference imparting control. The above is the outline of the braking force difference imparting control.

$$F\text{in}=F\text{base}\cdot K1\cdot K2\cdot K3 \qquad (2)$$

Drive Force Increase Control:

The final braking force Fin which is applied to the steerable wheel located inside the target vehicle locus by means of the braking force difference imparting control serves not only as a force for generating the above-described yawing moment, but also as a deceleration force for decelerating the vehicle. Accordingly, when the final braking force Fin is large, contrary to the driver's intention, the vehicle may stop in the course of performance of the automatic parking control.

In view of this, when the final braking force Fin (the sum total of braking forces which act on the wheels of the vehicle as a result of the braking force difference imparting control) exceeds a predetermined reference value Fref, the present apparatus increases the drive force output from the engine 31 by an amount corresponding to the final braking force Fin.

Specifically, the present apparatus obtains a throttle value opening increase amount TAup corresponding to the final braking force Fin, and controls the throttle value actuator 32 such that the throttle value opening TA increases by the throttle value opening increase amount TAup from the reference opening corresponding to the operation amount Accp of the accelerator pedal AP.

Notably, even when the drive force output from the engine 31 is increased in this manner, substantially the same driving force is applied to each of the steerable wheels FR and FL, which are driven wheels, so that no yawing moment is generated only through execution of the drive force increase control. In other words, the drive force increase control does not affect the steering moment Ms generated by means of the braking force difference imparting control. The above is the outline of the drive force increase control.

Actual Operation:

The actual operation of the vehicle motion control apparatus 10 including the automatic steering control apparatus according to the present invention having the above-described structure will be explained while referring to FIGS. 9 to 15, which show flow charts of programs which are executed by the CPU 71 of the electronic control apparatus 70. In the flow charts, the symbol ** attached to the end of various variables, flags, or symbols collectively represents the symbols fl, fr, rl, and rr and indicates that the particular variable, flag, or symbol applies to all of the wheels FR, FL, etc. of the vehicle.

Figure 9:
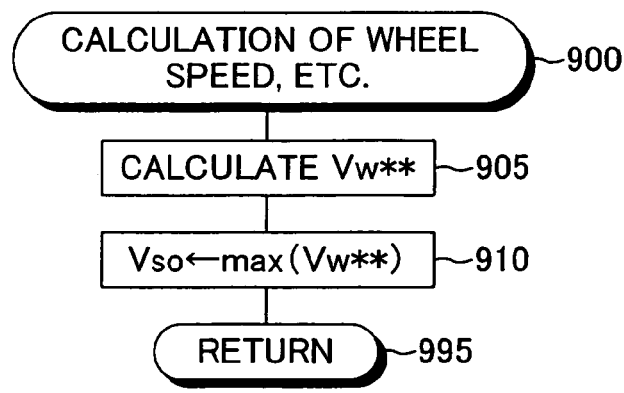
FIG. 9 is a flowchart showing a program by which the CPU shown in FIG. 1 calculates wheel speeds and other parameters.

The CPU 71 repeatedly performs a program shown in FIG. 9 at prescribed time intervals so as to calculate wheel speed Vw, etc. At a prescribed timing, the CPU 71 starts processing of the program from Step 900. The CPU 71 proceeds to Step 905 and calculates the wheel speed Vw (the speed of the outer periphery of the wheel (tire)) for each wheel FR, FL, etc. Specifically, the CPU 71 calculates the wheel speed Vw of each wheel FR, FL, etc. based on the time intervals between pulses of a signal which each wheel speed sensor 51  outputs.

Next, the CPU 71 proceeds to Step 910 and calculates the largest value of the wheel speed Vw of each wheel FR, FL, etc. as the estimated vehicle-body speed Vso. The average of the wheel speed VW of each wheel FR, FL, etc. may be calculated as the estimated vehicle-body speed Vso. Then, the CPU 71 proceeds to Step 995 so as to end the current execution of the present program.

Next, control of the throttle valve THR will be described. The CPU 71 repeatedly executes the program shown in FIG. 10 at prescribed intervals. At a prescribed timing, the CPU 71 starts processing of the program from Step 1000. The CPU 71 proceeds to Step 1005 and determines a base target throttle valve opening TAt0 on the basis of the value of the accelerator pedal operation amount Accp detected by means of the accelerator pedal operation sensor 53 and with reference to a table described in the box of Step 1005. As a result, the base target throttle valve opening TAt0 is set to a value corresponding to the accelerator pedal operation amount Accp; i.e., the amount by which the driver operates the accelerator pedal.

Next, the CPU 71 proceeds to Step 1010 so as to determine whether the value of a drive-force-increase-control execution flag DRIVE is "1." The drive-force-increase-control execution flag DRIVE indicates that the drive force increase control is being performed when the value is "1." The drive-force-increase-control execution flag DRIVE indicates that the drive force increase control is not currently performed when the value is "0."

Here, it is assumed that automatic parking control is not performed, and therefore, the drive force increase control is not performed. In this case, the CPU 71 makes a "No" determination in Step 1010, and then proceeds to Step 1015 so as to store, as a final target throttle valve opening TAt, the above-described base target throttle valve opening TAt0 as is. In Step 1020 subsequent thereto, the CPU 71 supplies a drive signal to the throttle valve actuator 32 such that the actual throttle valve opening TA coincides with the final target throttle valve opening TAt. After that, the CPU 71 proceeds to Step 1095 so as to end the current execution of the present program.

After that, unless the drive force increase control is started, the CPU 71 repeatedly executes the processing of Steps 1000 to 1010,1015, and 1020. As a result, the throttle valve opening TA is controlled to an opening corresponding to the accelerator pedal operation amount Accp.

Next, setting of a target steering angle for automatic parking control will be described. The CPU 71 repeatedly executes the program shown in FIG. 11 at prescribed intervals. At a prescribed timing, the CPU 71 starts processing of the program from Step 1100. The CPU 71 proceeds to Step 1105 and determines whether the value of an automatic-parking-control execution flag PARK is "0." The automatic-parking-control execution flag PARK indicates that the automatic parking control is being performed when the value is "1." The automatic-parking-control execution flag indicates that the automatic parking control is not currently performed when the value is "0."

At the present stage, the automatic parking control is assumed not to be currently performed. Therefore, the CPU 71 makes a "Yes" determination in Step 1105, and then proceeds to Step 1110 so as to determine whether input of data regarding a target parking state has been completed, and the parking switch 61 has been operated (that is, whether the automatic-parking-control start condition is satisfied). When the CPU 71 makes a "No" determination in Step 1110, the CPU 71 proceeds directly to Step 1195 so as to end the current execution of the present program.

Here, the automatic-parking-control start condition is assumed to have been satisfied because of driver's operation. In this case, the CPU 71 makes a "Yes" determination when it proceeds to Step 1110, and then proceeds to Step 1115 so as to determine a target steer angle map MapTHst (L)($0 \leq L \leq L$park) from the present state of the vehicle and the entered target parking state.

Subsequently, the CPU 71 performs the processing of Steps 1120 to 1130 so as to initialize all of a moved distance L, a steering-angle-difference integral value SDTHs, and a steering-angle-difference previous value DTHsb to zero.

The CPU 71 is then performs the processing of Steps 1135 to 1145 so as to change the value of the automatic-parking-control execution flag PARK from "0" to "1," and set both the value of a braking-force-difference-imparting-control execution flag BRAKE and the value of the drive-force-increase-control execution flag DRIVE to "0." After that, the CPU 71 ends the current execution of the present program. The braking-force-difference-imparting-control execution flag BRAKE indicates that the braking force difference imparting control is being performed when the value is "1." The braking-force-difference-imparting-control execution flag BRAKE indicates that the braking force difference imparting control is not currently performed when the value is "0."

Figure 11:
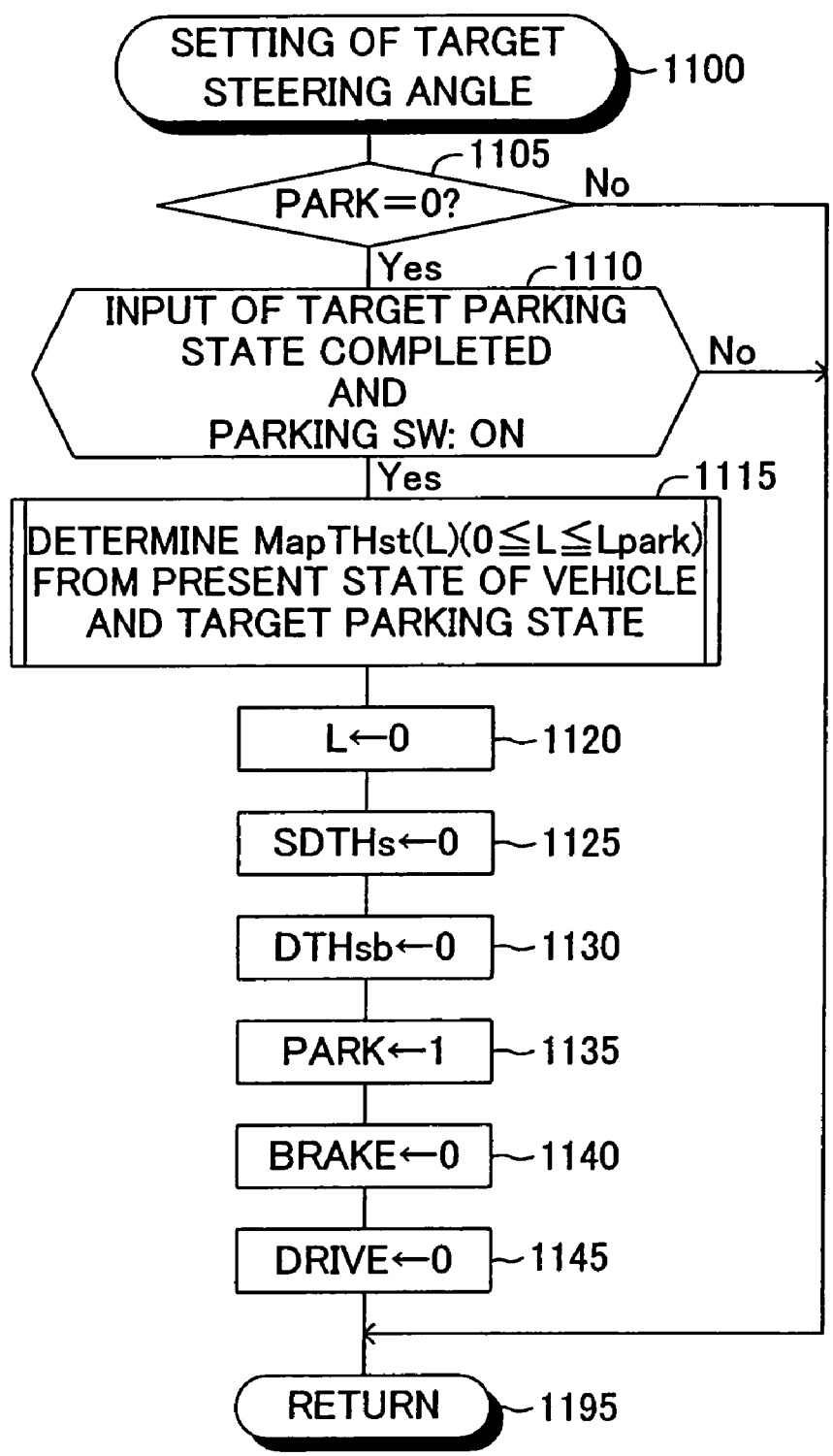
FIG. 11 is a flowchart showing a program by which the CPU shown in FIG. 1 sets target steering angle.

As a result of execution of the program of FIG. 11, the target steering angle map is set, and the automatic perking control is started. After that, since the value of the automatic-parking-control execution flag PARK has been set to "1," the CPU 71 repeatedly executes the processing of Steps 1100 and 1105 until the automatic parking control ends.

Next, execution of the automatic parking control will be described. The CPU 71 repeatedly executes the program shown in FIG. 12 at prescribed intervals. At a prescribed timing, the CPU 71 starts processing of the program from Step 1200. The CPU 71 proceeds to Step 1205 and determines whether the value of the automatic-parking-control execution flag PARK is "1." When the CPU 71 makes a "No" determination in Step 1205, the CPU 71 proceeds directly to Step 1295 so as to end the current execution of the present program. In this case, the automatic parking control is not performed.

Here, the present point in time is assumed to be immediately after the value of the automatic-parking-control execution flag PARK is set to "1" by the processing of the previously described Step 1135 (that is, immediately after the above-mentioned automatic-parking-control start condition is satisfied). In this case, the CPU 71 makes a "Yes" determination in Step 1205, and the proceeds to Step 1210 so as to determine the target steering angel THst for the present point in time from the target steering angle map MapTHst(L) set through the processing of the previously described Step 1115 and the present value of the moved distance L (the value is zero at the preset point in time).

Next, the CPU 71 proceeds to Step 1215 and stores, as a steering angle difference DTHs, a value obtained by subtracting the actual steering angel THs at the present point in time detected by means of the actual steering angle sensor 55 from the target steering angle THst at the present point in time. In Step 1220 subsequent thereto, the CPU 71 obtains a derivative value DDTHs in accordance with an equation described in the box of Step 1220.

Here, the value set in Step 1215 is used as the steering angle difference DTHs, and the value stored in Step 1235 (which will be described later) during the previous execution of the present program is used as the steering-angle-difference previous value DTHsb (however, only for the present execution of the present program, the value (0) set in the previously described Step 1130 is used. Δt is the execution interval of the present program.

Subsequently, in Step 1225, in accordance with the above-described Eq. (1), the CPU 71 obtains an instruction current id to be supplied to the steering actuator 23a on the basis of the obtained steering angle difference DTHs, the obtained steering-angle-difference derivative value DDTHs, and the steering-angle-difference integral value SDTHs. The steering-angle-difference integral value SDTHs is a value updated in the next step, Step 1230. That is, when the CPU 71 proceeds to Step 1230, the CPU 71 adds the steering angle difference DTHs set in Step 1215 to the steering-angle-difference integral value SDTHs at that time (zero at the present point in time), to thereby obtain a new steering-angle-difference integral value SDTHs.

Next, the CPU 71 proceeds to Step 1235 so as to store, as the steering-angle-difference previous value DTHsb, the steering angle difference DTHs (the value obtained during the current execution of this program) obtained in Step 1215. In Step 1240, the CPU 71 instructs supply of the obtained instruction current id to the steering actuator 23a. As a result, the steerable wheels FR and FL are automatically steered.

Next, the CPU 71 proceeds to Step 1245, and adds to the prevent value of the moved distance L (zero at the present point in time) a value obtained by multiplying the present estimated vehicle body speed Vso calculated in the previously described Step 910 by the above-described Δt (that is, a distance over which the vehicle moved during a single execution interval of the present program), to thereby obtain a new moved distance L.

The CPU 71 then proceeds to Step 1250 so as to determine whether the updated moved distance L becomes equal to or greater than the value Lpark (that is, the vehicle has moved to the target parking state) or the absolute value of the steering wheel operation torque Ts has exceeded a predetermined value Tsref (that is, the driver has touched the steering wheel 21) (accordingly, whether the automatic-parking-control end condition is satisfied).

At the present point in time, since the moved distance L is zero, unless the driver touches the steering wheel 21, the CPU 71 makes a "No" determination in Step 1250, and proceeds directly to Step 1295 so as to end the current execution of the present program. After that, unless the driver touches the steering wheel 21, the CPU 71 repeatedly performs the processing of Steps 1200 to 1250 until the moved distance L becomes equal to the value Lpark. As a result, the processing of Step 1240 is repeatedly executed, whereby the automatic steering of the steerable wheels FR and FL is performed.

When the moved distance L becomes equal to the value Lpark, the CPU 71 makes a "Yes" determination when it proceeds to Step 1250, and then proceeds to Step 1255. In Step 1255, the CPU 71 changes the value of the automatic-parking-control execution flag PARK from "1" to "0." As a result, after this point in time, the CPU 71 repeats the operation of making "No" determination in Step 1205 and proceeding directly to Step 1295 so as to end the present program. Thus, the automatic parking control ends.

Next, the determination on start and end of the braking force difference imparting control will be described. The CPU 71 repeatedly executes the program shown in FIG. 13 at prescribed intervals. At a prescribed timing, the CPU 71 starts processing of the program from Step 1300. The CPU 71 proceeds to Step 1305 and determines whether the value of the automatic-parking control execution flag PARK is "1."

Figure 12:
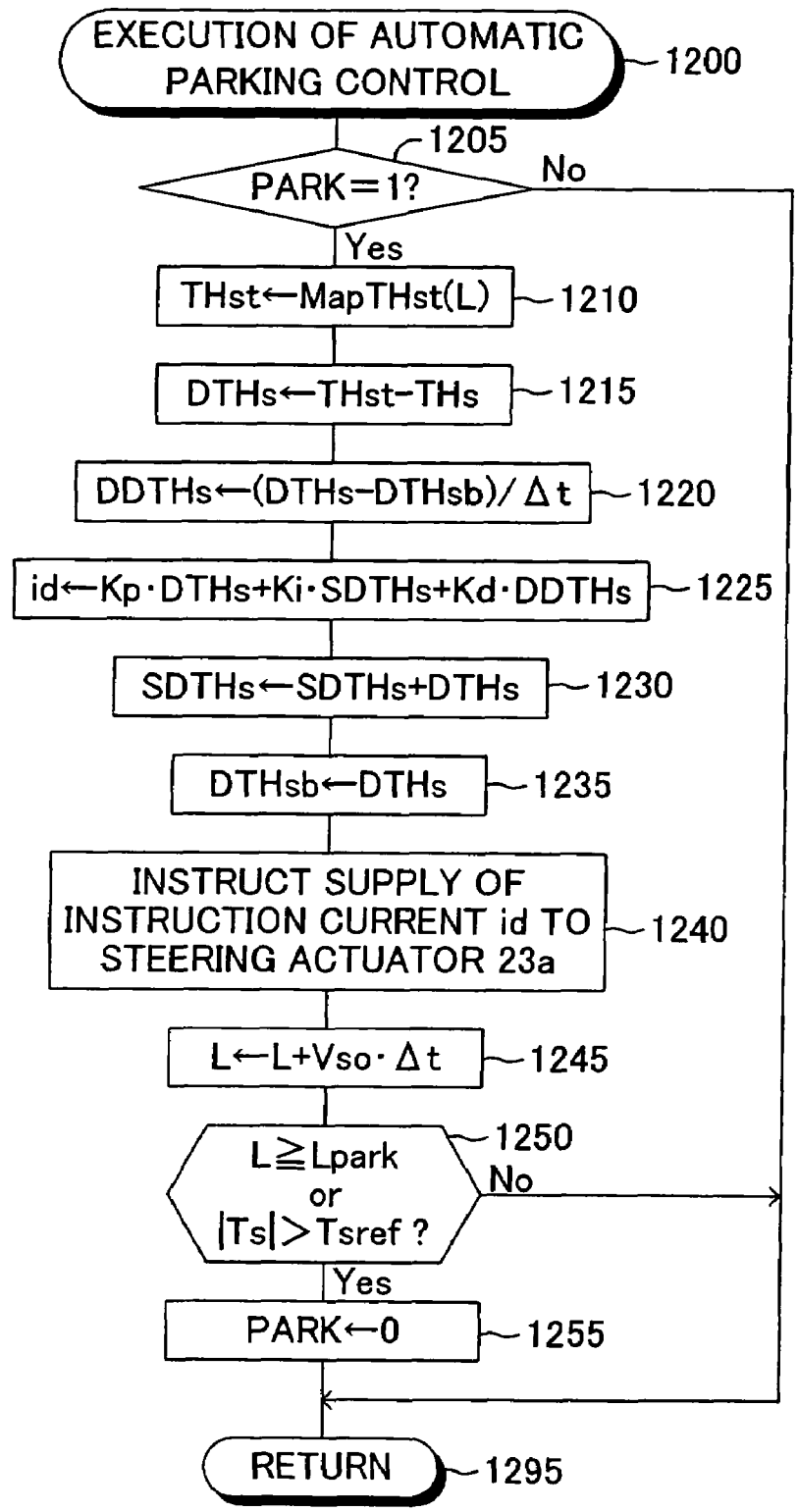
FIG. 12 is a flowchart showing a program by which the CPU shown in FIG. 1 performs automatic parking control.
Figure 13:
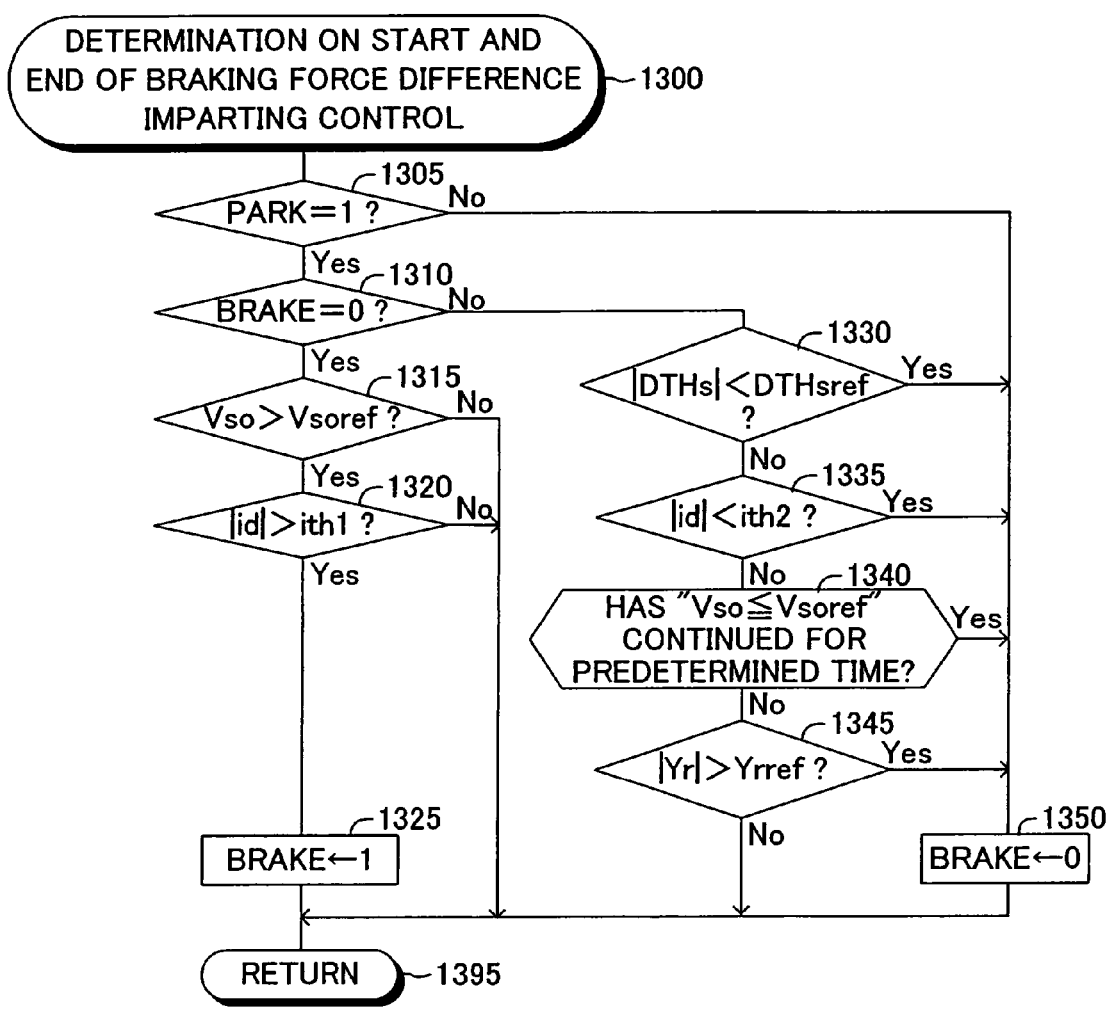
FIG. 13 is a flowchart showing a program by which the CPU shown in FIG. 1 performs determination on start and end of braking force difference imparting control.

Here, the automatic parking control is assumed to be currently performed through execution of the program of FIG. 12. In this case, the CPU 71 makes a "Yes" determination in Step 1305, and then proceeds to Step 1310 so as to determine whether the value of the braking-force-difference-imparting-control execution flag BRAKE is "0." At the present point in time, the value of the braking-force-difference-imparting control execution flag BRAKE has been set to "0" because of the initialization processing of the previously described Step 1140.

Accordingly, the CPU 71 makes a "Yes" determination in Step 1310, and then proceeds to Step 1315 so as to determine whether the estimated vehicle body speed Vso at the present point in time is greater than a predetermined low speed Vsoref. When the CPU 71 makes a "Yes" determination in Step 1315, the CPU 71 proceeds to Step 1320 so as to determine whether the absolute value of the instruction current id at the present point in time determined in the previously described Step 1225 exceeds a reference value ith1. When the CPU 71 makes a "Yes" determination in Step 1320, the CPU 71 proceeds to Step 1325 so as to change the value of the braking-force-difference-imparting-control execution flag BRAKE from "0" to "1," and then proceeds to Step 1395 so as to end the current execution of the present program.

Meanwhile, when the CPU 71 makes a "No" determination in Step 1315 or 1320, the CPU 71 proceeds directly to Step 1395 so as to maintain the value of the braking-force-difference-imparting-control execution flag BRAKE at "0." That is, the AND condition of Steps 1315 and 1320 corresponds to the braking-force-difference-imparting-control start condition. The purpose of incorporating the condition of Step 1325 in the braking-force-difference-imparting-control start condition is to prevent immediate stoppage of the vehicle, which immediate stoppage would otherwise occur when the braking force difference imparting control is started while the vehicle is traveling at very low speed.

Next, the case in which the braking-force-difference-imparting-control start condition has been satisfied will be described. In this case, since the value of the braking-force-difference-imparting-control execution flag BRAKE has been set to "1," the CPU 71 makes a "No" determination when it proceeds to Step 1310, and then proceeds to Step 1330.

In Step 1330, the CPU 71 determines whether the absolute value |DTHs| of the steering angle difference at the present point in time is smaller than a reference value DTHsref. When the CPU 71 makes a "No" determination in Step 1330, in Step 1335 subsequent thereto, the CPU 71 determines whether the absolute value of the instruction current id at the present point in time is smaller than a predetermined reference value ith2, which is smaller than the above-mentioned reference value ith1. When the CPU 71 makes a "No" determination in Step 1335, in Step 1340 subsequent thereto, the CPU 71 determines whether the state in which "the estimated vehicle body speed Vso is equal to or smaller than the above-described value Vsoref" has continued for a predetermined period of time. When the CPU 71 makes a "No" determination in Step 1340, the CPU 71 proceeds to Step 1345 so as to determine whether the absolute value of the yaw rate Yr at the present point in time is greater than a predetermined value Yrref. When the CPU 71 makes a "No" determination in Step 1345, the CPU 71 proceeds to Step 1395. In this case, the value of the braking-force-difference-imparting-control execution flag BRAKE is maintained at "1."

Meanwhile, when the CPU 71 makes a "Yes" determination in any of Steps 1330 to 1345, the CPU 71 proceeds to Step 1350 so as to change the value of the braking-force-difference-imparting-control execution flag BRAKE from "1" to "0." The OR condition of Steps 1330 to 1345 corresponds to the braking-force-difference-imparting-control end condition.

The conditions of Steps 1330 and 1335 correspond to a state in which the degree of insufficiency of the steering drive force of the steering actuator 23a becomes lower than a predetermined level. The condition of Step 1340 corresponds to a state in which the vehicle tends to stop. The purpose of incorporating the condition of Step 1345 in the braking-force-difference-imparting-control end condition is to prevent spin of the vehicle, which spin would otherwise occur when the braking force difference imparting control is performed while the vehicle is on a road surface having a low friction coefficient (e.g., icy road).

Moreover, even in the case where the automatic parking control is being executed and the braking-force-difference-imparting-control start condition is satisfied (i.e., when PARK=1 and BRAKE=1), when the processing of the previously described step 1255 is performed (that is, when the automatic-parking-control end condition is satisfied), the CPU 71 makes a "No" determination when it proceeds to Step 1305, and then proceeds to Step 1350. By virtue of this, when the automatic parking control ends, the braking force difference imparting control ends. In the above-described manner, determination regarding start and end of the braking force difference imparting control is performed, and the value of the braking-force-difference-imparting-control execution flag BRAKE is maintained at or changed to "0" or "1" in accordance with the results of the determination.

Next, execution of the braking force difference imparting control will be described. The CPU 71 repeatedly executes the program shown in FIG. 14 at prescribed intervals. At a prescribed timing, the CPU 71 starts processing of the program from Step 1400. The CPU 71 proceeds to Step 1405 and determines whether the value of the braking-force-difference-imparting-control execution flag BRAKE is "1." When the CPU 71 makes a "No" determination in Step 1405, the CPU 71 proceeds directly to Step 1495 so as to end the current execution of the present program. In this case, the braking force difference imparting control is not executed.

Here, the value of the braking-force-difference-imparting-control execution flag BRAKE is assumed to have been set to "1" by the processing of the previously described Step 1325. In this case, the CPU 71 makes a "Yes" determination in Step 1405, and then proceeds to Step 1410 so as to obtain a base braking force Fbase from the absolute value of the steering angle difference DTHs at the present point in time and the map MapFbase shown in FIG. 5.

Next, the CPU 71 proceeds to Step 1415 so as to obtain a mean tire pressure Pmean, which is the mean value of the tire pressures Pfr and Pfl of the steerable wheels FR and FL detected by means of the tire pressure sensors 57fr and 57fl, and then proceeds to Step 1420 so as to obtain a coefficient K1 from the mean tire pressure Pmean and the map MapK1 shown in FIG. 6.

Subsequently, the CPU 71 proceeds to Step 1425 so as to obtain a road surface friction coefficient μ at the present point in time by one of widely known conventional methods, and then proceeds to Step 1430 so as to obtain a coefficient K2 from the road surface friction coefficient μ and the map MapK2 shown in FIG. 7.

Next, the CPU 71 proceeds to Step 1435 so as to obtain a mean vehicle height hmean, which is the mean value of the vehicle heights hfr, hfl, hrr, and hrl of the wheels FR, FL, RR, and RL detected by means of the tire vehicle height sensors 58fr, 58fl, 58rr, and 58rl, and then proceeds to Step 1440 so as to obtain a coefficient K3 from the mean vehicle height hmean and the map MapK3 shown in FIG. 8.

Subsequently, the CPU 71 proceeds to Step 1445 so as to obtain a final braking force Ffin on the basis of the base braking force Fbase and the coefficients K1, K2, K3, and in accordance with the above-described Eq. (2). The CPU 71 then proceeds to Step 1450 so as to obtain a target wheel cylinder pressure PWt on the basis of the final braking force Ffin and in accordance with a function funcPWt(Ffin) for obtaining the target wheel cylinder pressure PWt necessary to generate the final braking force Ffin.

Subsequently, the CPU 71 proceeds to Step 1455 so as to control the solenoid valves, the hydraulic pump (motor), etc. of the brake hydraulic controller 40 such that the actual wheel cylinder pressure of the steerable wheel (front wheel) located inside the target vehicle locus becomes equal to the target wheel cylinder pressure PWt. The CPU 71 then proceeds to Step 1495 so as to end the current execution of the present program.

With this operation, the final braking force Ffin is applied to the steerable wheel located inside the target vehicle locus. After that, so long as the value of the braking-force-difference-imparting-control execution flag BRAKE is "1," the CPU 71 repeatedly executes the processing of Steps 1400 to 1455. As a result, the braking force difference imparting control is achieved.

Next, the determination on start and end of the drive force increase control will be described. The CPU 71 repeatedly executes the program shown in FIG. 15 at prescribed intervals. At a prescribed timing, the CPU 71 starts processing of the program from Step 1500. The CPU 71 proceeds to Step 1505 and determines whether the value of the value of the braking-force-difference-imparting-control execution flag BRAKE is "1."

Figure 14:
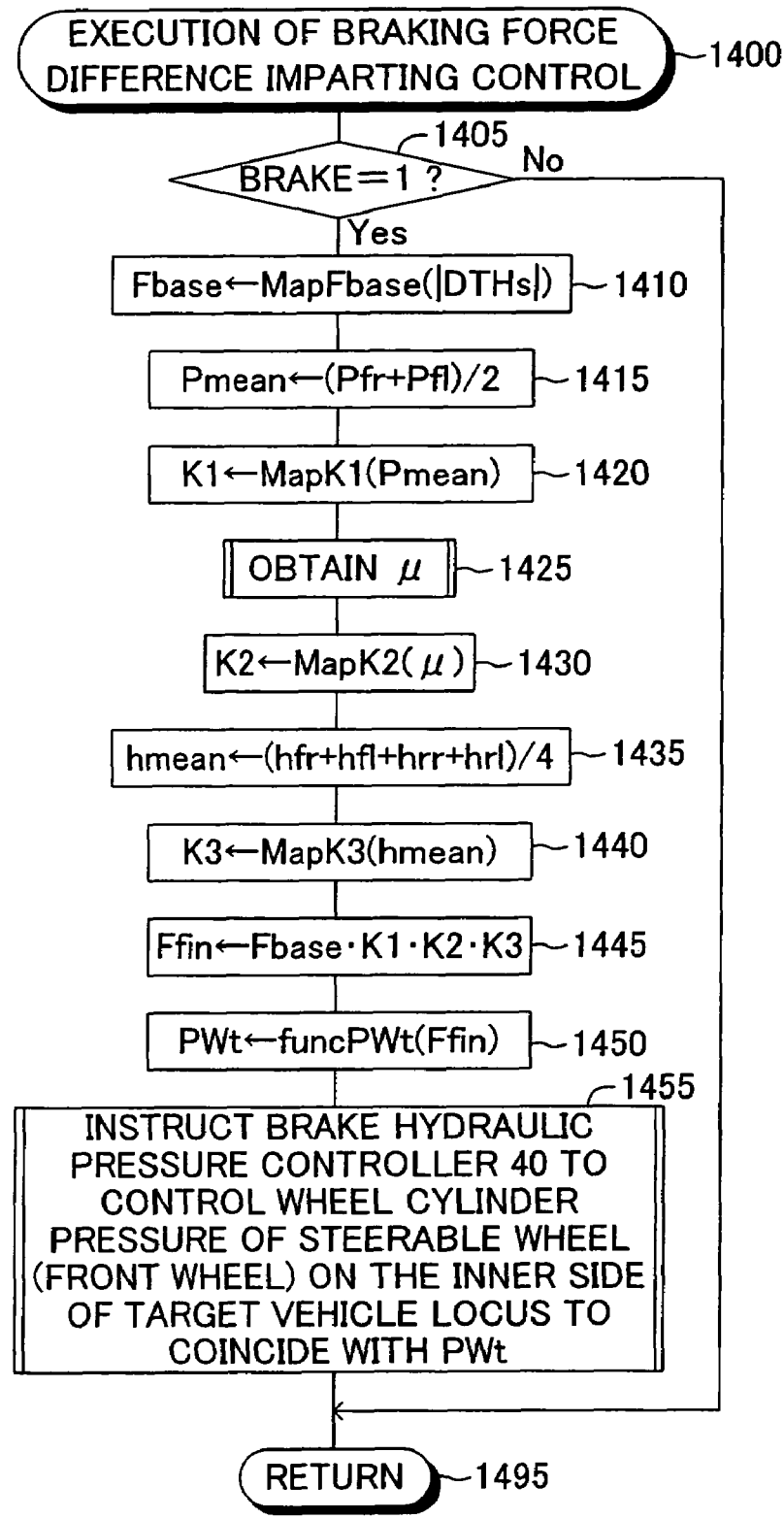
FIG. 14 is a flowchart showing a program by which the CPU shown in FIG. 1 performs the braking force difference imparting control.
Figure 15:
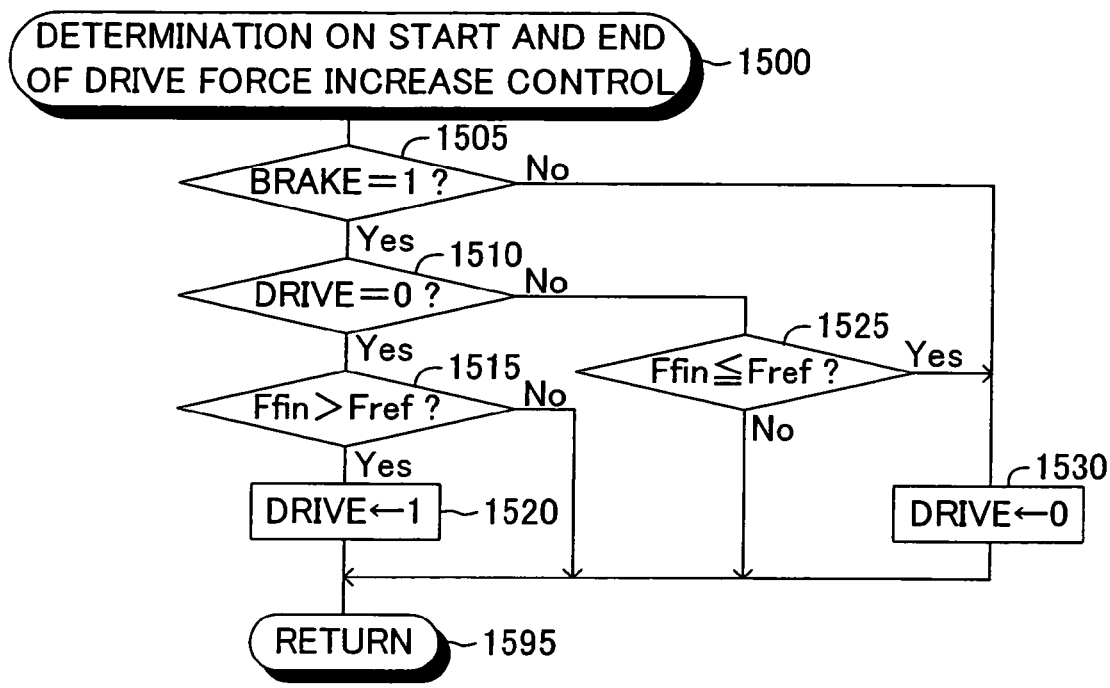
FIG. 15 is a flowchart showing a program by which the CPU shown in FIG. 1 performs determination on start and end of drive force increase control.

Here, the braking force difference imparting control is assumed to be currently performed through execution of the program of FIG. 14. In this case, the CPU 71 makes a "Yes" determination in Step 1505, and then proceeds to Step 1510 so as to determine whether the value of the drive-force-increase-control execution flag DRIVE is "0." At the present point in time, the value of the drive-force-increase-control execution flag DRIVE has been set to "0" because of the initialization processing of the previously described Step 1145.

Accordingly, the CPU 71 makes a "Yes" determination in Step 1510, and then proceeds to Step 1515 so as to determine whether the final braking force Ffin at the present point time calculated in the previously described step 1445 is greater than a predetermined reference value Fref. When the CPU 71 makes a "Yes" determination in Step 1515, the CPU 71 proceeds to Step 1520 so as to change the value of the drive-force-increase-control execution flag DRIVE from "0" to "1," and then proceeds to Step 1595 so as to end the current execution of the present program.

Meanwhile, when the CPU 71 makes a "No" determination in Step 1515, the CPU 71 proceeds directly to Step 1595 so as to maintain the value of the drive-force-increase-control execution flag DRIVE at "0." That is, the condition of Step 1515 corresponds to the drive-force-increase-control start condition.

Next, the case in which the drive-force-increase-control start condition has been satisfied will be described. In this case, the value of the drive-force-increase-control execution flag DRIVE has been set to "1," the CPU 71 makes a "No" determination when it proceeds to Step 1510, and then proceeds to Step 1525.

In Step 1525, the CPU 71 determines whether the final braking force Ffin at the present point time is equal to or smaller than the predetermined reference value Fref. When the CPU 71 makes a "No" determination in Step 1525, the CPU 71 proceeds to Step 1595. In this case, the value of the drive-force-increase-control execution flag DRIVE is maintained at "1."

Meanwhile, when the CPU 71 makes a "Yes" determination in Step 1525, the CPU 71 proceeds to Step 1530 so as to change the value of the drive-force-increase-control execution flag DRIVE from "1" to "0." That is, the condition of Step 1525 corresponds to the drive-force-increase-control end condition.

Moreover, even in the case where the automatic parking control is being executed, the braking force difference imparting control is being executed, and the drive-force-increase-control start condition is satisfied (i.e., when PARK=1, BRAKE=1, and DRIVE=1), when the processing of the previously described step 1255 is performed (that is, when the automatic-parking-control end condition is satisfied) or when the processing of the previously described step 1350 is performed (that is, when the braking-force-difference-imparting-control end condition is satisfied), the CPU 71 makes a "No" determination when it proceeds to Step 1505, and then proceeds to Step 1530.

By virtue of this, when the automatic parking control ends or when the braking force difference imparting control ends during performance of the automatic parking control, the drive force increase control ends. In the above-described manner, determination regarding start and end of the drive force increase control is performed, and the value of the drive-force-increase-control execution flag DRIVE is maintained at or changed to "0" or "1" in accordance with the results of the determination.

Next, the execution of the drive force increase control will be described. Here, the value of the drive-force-increase-control execution flag DRIVE is assumed to have been set to "1" by the processing of the previously described Step 1520, the CPU 71, which repeatedly executes the program of FIG. 10 at predetermined intervals, makes a "Yes" determination when it proceeds to Step 1010, and then proceeds to Step 1025 so as to obtain a throttle valve opening increase amount TAup on the basis of the final braking force Ffin at the present point in time calculated in the previously described Step 1445 and with reference to a table described in the box of Step 1025 and defining the relation between the final braking force Ffin and the throttle valve opening increase amount TAup.

Subsequently, the CPU 71 proceeds to Step 1030 so as to store, as a final target throttle valve opening TAt, a value obtained by adding the throttle valve opening increase amount TAup to the base target throttle valve opening TAt0 obtained in the previously described Step 1005, and then performs the processing of the previously described Step 1020. As a result, the throttle valve actuator 32 is controlled such that the throttle valve opening TA is increased from the base opening corresponding to the operation amount Accp of the accelerator pedal AP by the throttle valve opening increase amount TAup corresponding to the final braking force Ffin.

After that, so long as the value of the value of the drive-force-increase-control execution flag DRIVE is "1," the CPU 71 repeatedly executes the processing of Steps 1000 to 1010, 1025, 1030, 1020. As a result, the drive force increase control is achieved.

As described above, the automatic steering control apparatus (automatic parking control apparatus) for a vehicle according to the present invention performs the braking force difference imparting control for imparting a braking force (final braking force Ffin) to a steerable wheel located within the target vehicle locus (see Steps 1445 to 1455 of FIG. 14), when the steering drive force of the steering actuator 23a is determined to be insufficient (see Steps 1315 and 1320 of FIG. 13) during performance of the automatic parking control for automatically steering the steerable wheels FR and FL such that the actual steering angle THs of the steerable wheels FR and FL follows the target steering angel THst, without requiring the driver's steering-wheel operation, to thereby move the vehicle to a parking state requested by the driver.

With this operation, a steering moment Ms is generated in the steerable wheels FR and FL in a direction for compensating for the insufficiency of the steering drive force of the steering actuator 23a, whereby compensation is made for the insufficiency of the steering drive force. As a result, the actual steering angle THs of the steerable wheels FR and FL becomes able to follow the target steering angel THst, whereby the expected automatic steering control can be maintained and achieved.

Figure 10:
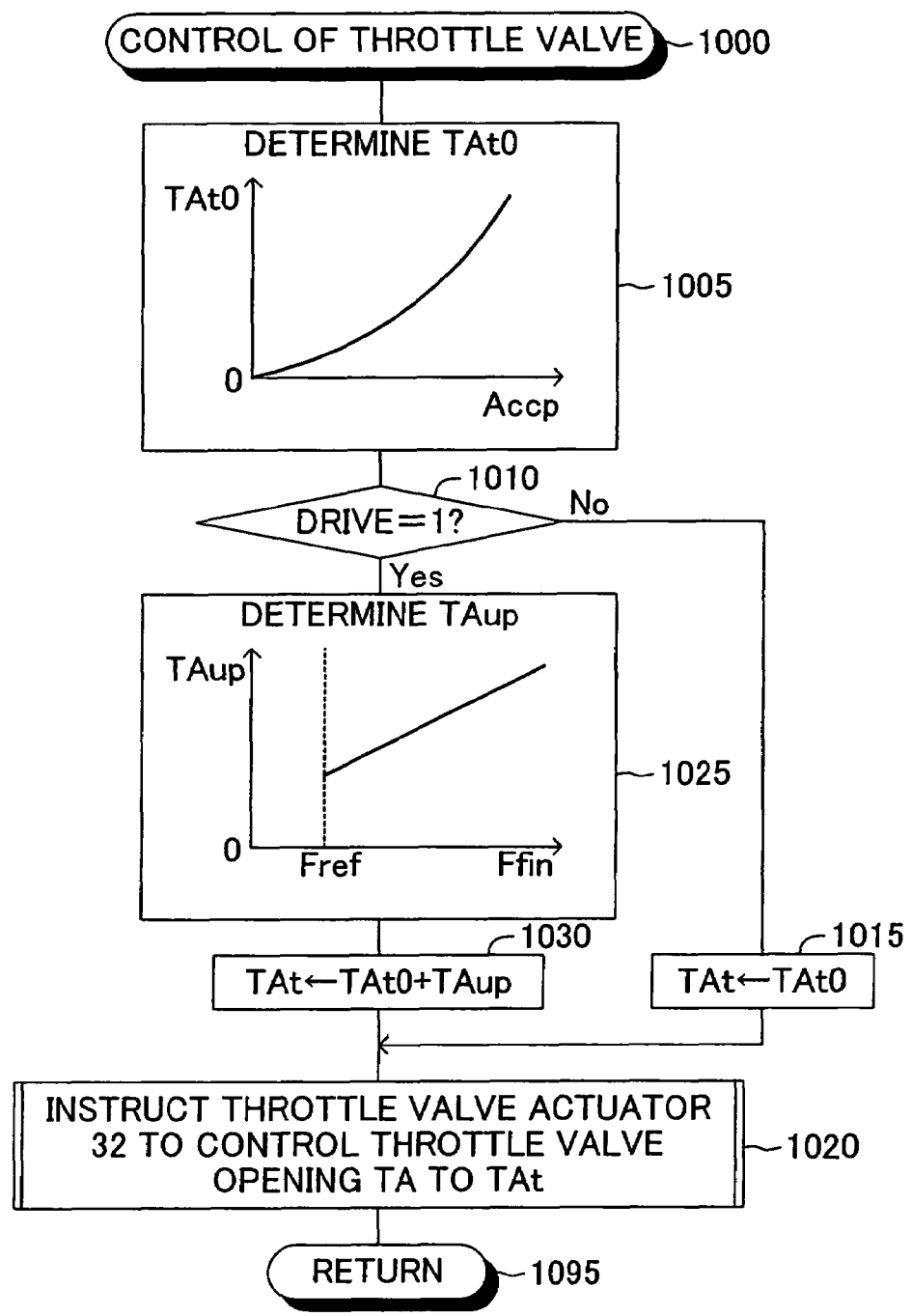
FIG. 10 is a flowchart showing a program by which the CPU shown in FIG. 1 performs throttle valve control.

Moreover, when the final braking force Ffin exceeds the reference value Fref during performance of the braking force difference imparting control (see Step 1515 of FIG. 15), the automatic steering control apparatus performs the drive force increase control for increasing the drive force output from the engine 31 by an amount corresponding to the final braking force Ffin (see Steps 1025 and 1030 of FIG. 10). As a result, stoppage of the vehicle, which stoppage would otherwise occur because of the braking force difference imparting control, can be avoided, and the driver can continuously obtain a sensation of acceleration corresponding to the driver's accelerator operation even during a period in which the braking force difference imparting control is performed.

The present invention is not limited to the above-described embodiment, and various modifications may be employed within the scope of the present invention. For example, in the above-described embodiment, the braking-force-difference-imparting-control start condition is determined to be satisfied when the absolute value of the instruction current id supplied to the steering actuator 23a (a value representing the degree of insufficiency of the steering drive force) exceeds the predetermined reference value ith1. However, the braking-force-difference-imparting-control start condition may be determined to be satisfied when the absolute value of the steering angle difference DHTHs (a value representing the degree of insufficiency of the steering drive force) exceeds a predetermined reference value.

In the above-described embodiment, the base braking force Fbase, on the basis of which the final braking force Ffin is obtained, is determined on the basis of only the absolute value |DTHs| of the steering angle difference (see Step 1410 of FIG. 14). However, the automatic steering control apparatus may be configured to determine the base braking force Fbase on the basis of the absolute value of a value obtained by subjecting the steering angle difference DTHs to proportional-integral-derivative processing (PID processing).

In the above-described embodiment, the automatic steering control apparatus is configured to apply a braking force only to the steerable wheel (front wheel) located inside the target vehicle locus by means of the braking force difference imparting control. However, the automatic steering control apparatus may be configured to apply predetermined braking forces to the front and rear wheels located inside the target vehicle locus. Alternatively, the automatic steering control apparatus may be configured to apply a predetermined braking force only to the rear wheel located inside the target vehicle locus.

In the above-described embodiment, the automatic steering control apparatus is configured to set the target wheel cylinder pressure PWt of the steerable wheel located inside the target vehicle locus to a value corresponding only to the final braking force Ffin, regardless of whether or not the driver is operating the brake pedal, during performance of the braking force difference imparting control (see Step 1450 of FIG. 14). However, the automatic steering control apparatus may be configured such that when the driver is operating the brake pedal, the target wheel cylinder pressure PWt is set to a value obtained by adding, to the value corresponding only to the final braking force Ffin, a brake hydraulic pressure corresponding to the brake pedal operation.

In the above-described embodiment, the automatic steering control apparatus is configured to generate a force for compensating for the insufficiency of the steering drive force of the steering actuator 23a through the braking force difference imparting control. However, when the present invention is applied to a four-wheel drive vehicle (4 WD vehicle) capable of individually controlling the drive forces applied to the respective wheels, the automatic steering control apparatus may be configured to generate a force for compensating for the insufficiency of the steering drive force of the steering actuator 23a through performance of a drive force difference imparting control for generating a difference between the drive forces applied to the left-hand and right-hand wheels, respectively, of the vehicle.

In addition, the automatic steering control apparatus of the present invention may be applied to a so-called brake-by-wire system which detects an operation (stepping-on force, stroke, etc.) of the brake pedal on the basis of the output signal (electrical signal) from a stepping-on force sensor, a stroke sensor, etc., and generates a wheel cylinder pressure (pressure of a dual function wheel cylinder) on the basis of the detection results.

What is claimed is:

1. An automatic steering control apparatus for a vehicle, comprising:

actual-steering-angle signal receiving means for receiving a signal indicating an actual steering angle of steerable wheels of the vehicle;

target-steering-angle setting means for setting a target steering angle of the steerable wheels on the condition that a predetermined automatic-steering-control start condition is satisfied;

automatic steering control means for instructing a steering actuator, adapted to steer the steerable wheels, to generate a steering drive force such that the actual angle determined on the basis of the signal indicating the actual steering angle coincides with the set target steering angle;

insufficiency-degree index obtaining means for obtaining a value representing a degree of insufficiency of the steering drive force of the steering actuator; and steering drive force adding means for instructing an assisting force generation apparatus, adapted to generate an assisting force for compensating for the insufficiency of the steering drive force, to generate the assisting force when the value representing the degree of insufficiency of the steering drive force exceeds a predetermined reference value.

2. An automatic steering control apparatus for a vehicle according to claim 1, wherein the steering drive force adding means is configured such that when the value representing the degree of insufficiency of the steering drive force exceeds the predetermined reference value, the steering drive force adding means instructs a braking control apparatus, which serves as the assisting force generation apparatus, to perform a braking force difference imparting control for imparting a difference between a braking force acting on a left-hand wheel of the vehicle and that acting on a right-hand wheel of the vehicle such that a yawing moment is generated in the vehicle in a direction for compensating for the insufficiency of the steering drive force, or is configured such that when the value representing the degree of insufficiency of the steering drive force exceeds the predetermined reference value, the steering drive force adding means instructs a drive control apparatus, which serves as the assisting force generation apparatus, to perform a drive force difference imparting control for imparting a difference between a drive force acting on the left-hand wheel of the vehicle and that acting on the right-hand wheel of the vehicle such that a yawing moment is generated in the vehicle in a direction for compensating for the insufficiency of the steering drive force.

3. An automatic steering control apparatus for a vehicle according to claim 2, wherein the insufficiency-degree index obtaining means is configured to obtain, as the value representing the degree of insufficiency of the steering drive force, a current which is supplied to the steering actuator so as to drive the steering actuator.

4. An automatic steering control apparatus for a vehicle according to claim 2, wherein the insufficiency-degree index obtaining means is configured to obtain, as the value representing the degree of insufficiency of the steering drive force, a deviation of the actual steering angle from the target steering angle.

5. An automatic steering control apparatus for a vehicle according to claim 2, wherein the steering drive force adding means is configured to change the braking force difference or the drive force difference in accordance with the value representing the degree of insufficiency of the steering drive force.

6. An automatic steering control apparatus for a vehicle according to claim 5, wherein the steering drive force adding means includes influential value obtaining means for obtaining an influential value which imparts an influence on the force required to steer the steerable wheels, and is configured to change the braking force difference or the drive force difference in accordance with the influential value.

7. An automatic steering control apparatus for a vehicle according to claim 6, wherein the influential value obtaining means is configured to obtain tire pressures of the steerable wheels as the influential value.

8. An automatic steering control apparatus for a vehicle according to claim 6, wherein the influential value obtaining means is configured to obtain a road surface friction coefficient as the influential value, the road surface friction coefficient being a coefficient of friction between tires of the vehicle and a road surface on which the vehicle travels.

9. An automatic steering control apparatus for a vehicle according to claim 6, wherein the influential value obtaining means is configured to obtain, as the influential value, a value which changes with the total mass of the vehicle.

10. An automatic steering control apparatus for a vehicle according to claim 2, wherein the steering drive force adding means is configured to instruct the braking control apparatus to perform the braking force difference imparting control, and further includes drive force increase means for instructing a drive control apparatus to perform a drive force increase control for increasing the drive force acting on the vehicle, when the braking force difference imparting control is being performed and the total sum of braking forces acting on the wheels of the vehicle exceeds a predetermined value.

11. An automatic steering control apparatus for a vehicle according to claim 10, wherein the drive force increase means is configured to increase the drive force acting on the vehicle by an amount corresponding to the total sum of braking forces acting on the wheels of the vehicle.

12. A computer readable medium for storing an automatic steering control program for a vehicle, the program causing a computer to perform an automatic steering control for automatically steering steerable wheels of the vehicle, the program comprising:

an actual-steering-angle signal receiving function for receiving a signal indicating an actual steering angle of the steerable wheels of the vehicle;

a target-steering-angle setting function for setting a target steering angle of the steerable wheels on the condition that a predetermined automatic-steering-control start condition is satisfied;

an automatic steering control function for instructing a steering actuator, adapted to steer the steerable wheels, to generate a steering drive force such that the actual angle determined on the basis of the signal indicating the actual steering angle coincides with the set target steering angle;

an insufficiency-degree index obtaining function for obtaining a value representing a degree of insufficiency of the steering drive force of the steering actuator; and a steering drive force adding function for instructing an assisting force generation apparatus, adapted to generate an assisting force for compensating for the insufficiency of the steering drive force, to generate the assisting force when the value representing the degree of insufficiency of the steering drive force exceeds a predetermined reference value.

\* \* \* \* \*